(12) United States Patent
Gingell et al.

(10) Patent No.: US 11,494,485 B2
(45) Date of Patent: Nov. 8, 2022

(54) UNIFORM ENCLAVE INTERFACE

(71) Applicant: Google LLC, Mountain View, CA (US)

(72) Inventors: Matthew Gingell, Woodinville, WA (US); Peter Gonda, Seattle, WA (US); Alexander Thomas Cope, Seattle, WA (US); Sergey Karamov, Redmond, WA (US); Keith Moyer, Kirkland, WA (US); Uday Savagaonkar, Redmond, WA (US); Chong Cai, Kirkland, WA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/046,593

(22) PCT Filed: Jul. 18, 2018

(86) PCT No.: PCT/US2018/042625
§ 371 (c)(1),
(2) Date: Oct. 9, 2020

(87) PCT Pub. No.: WO2019/212579
PCT Pub. Date: Nov. 7, 2019

(65) Prior Publication Data
US 2021/0232676 A1 Jul. 29, 2021

Related U.S. Application Data

(60) Provisional application No. 62/664,438, filed on Apr. 30, 2018.

(51) Int. Cl.
*G06F 21/53* (2013.01)
*G06F 21/12* (2013.01)
(Continued)

(52) U.S. Cl.
CPC .............. *G06F 21/53* (2013.01); *G06F 21/12* (2013.01); *G06F 21/57* (2013.01); *G06F 21/6245* (2013.01); *G06F 21/74* (2013.01)

(58) Field of Classification Search
CPC .......... G06F 21/12; G06F 21/53; G06F 21/74; G06F 21/57; G06F 21/62; G06F 21/6245;
(Continued)

(56) References Cited

U.S. PATENT DOCUMENTS 5,970,250 A 10/1999 England et al.
6,779,112 B1 8/2004 Guthery
(Continued)

FOREIGN PATENT DOCUMENTS

EP 1757067 A1 2/2007
WO 2012082410 A2 6/2012
(Continued)

OTHER PUBLICATIONS

International Preliminary Report on Patentability for International Application No. PCT/US2018/042695 dated Nov. 12, 2020. 9 pages.
(Continued)

*Primary Examiner* — Samson B Lemma
(74) *Attorney, Agent, or Firm* — Lerner, David, Littenberg, Krumholz & Mentlik, LLP

(57) ABSTRACT

A uniform enclave interface is provided for creating and operating enclaves across multiple different types of back-ends and system configurations. For instance, an enclave manager may be created in an untrusted environment of a host computing device. The enclave manager may include instructions for creating one or more enclaves. An enclave may be generated in memory of the host computing device using the enclave manager. One or more enclave clients of the enclave may be generated by the enclave manager such
(Continued)

that the enclave clients configured to provide one or more entry points into the enclave. One or more trusted application instances may be created in the enclave.

19 Claims, 13 Drawing Sheets

(51) Int. Cl.
*G06F 21/57* (2013.01)
*G06F 21/62* (2013.01)
*G06F 21/74* (2013.01)

(58) Field of Classification Search
CPC ............... G06F 21/0897; G06F 21/71; G06F 2221/0797; H04L 63/0428; H04L 63/10
USPC ........................................................ 726/26
See application file for complete search history.

(56) References Cited

U.S. PATENT DOCUMENTS

| | | | |
|---|---|---|---|
| 6,938,159 B1 | 8/2005 | O'Connor et al. | |
| 7,904,940 B1 | 3/2011 | Hernacki et al. | |
| 8,145,909 B1 | 3/2012 | Agrawal et al. | |
| 8,155,036 B1 | 4/2012 | Brenner et al. | |
| 8,631,486 B1 | 1/2014 | Friedman et al. | |
| 9,246,690 B1* | 1/2016 | Roth | H04L 9/3268 |
| 9,444,627 B2* | 9/2016 | Varadarajan | G09C 1/00 |
| 9,444,948 B1 | 9/2016 | Ren et al. | |
| 9,531,727 B1 | 12/2016 | Himberger et al. | |
| 9,584,517 B1* | 2/2017 | Roth | G06F 21/6209 |
| 9,615,253 B1 | 4/2017 | Osborn | |
| 9,710,748 B2 | 7/2017 | Ross et al. | |
| 9,735,962 B1 | 8/2017 | Yang et al. | |
| 9,754,116 B1* | 9/2017 | Roth | G06F 21/6218 |
| 9,779,352 B1 | 10/2017 | Hyde et al. | |
| 9,940,456 B2* | 4/2018 | Nesher | G06F 21/53 |
| 10,007,464 B1 | 6/2018 | Blinzer | |
| 10,375,177 B1 | 8/2019 | Bretan | |
| 10,382,202 B1 | 8/2019 | Ohsie et al. | |
| 10,530,777 B2* | 1/2020 | Costa | H04L 63/101 |
| 11,210,412 B1 | 12/2021 | Ghetti et al. | |
| 2004/0030764 A1 | 2/2004 | Birk et al. | |
| 2005/0144437 A1 | 6/2005 | Ransom et al. | |
| 2005/0166191 A1 | 7/2005 | Kandanchatha et al. | |
| 2006/0174037 A1 | 8/2006 | Bernardi et al. | |
| 2006/0225055 A1 | 10/2006 | Tieu | |
| 2008/0091948 A1 | 4/2008 | Hofmann et al. | |
| 2009/0077655 A1 | 3/2009 | Sermersheim et al. | |
| 2010/0150352 A1 | 6/2010 | Mansour et al. | |
| 2011/0225559 A1 | 9/2011 | Nishide | |
| 2012/0151568 A1 | 6/2012 | Pieczul et al. | |
| 2012/0159184 A1 | 6/2012 | Johnson et al. | |
| 2013/0159726 A1 | 6/2013 | McKeen et al. | |
| 2014/0089617 A1 | 3/2014 | Polzin et al. | |
| 2014/0157410 A1 | 6/2014 | Dewan et al. | |
| 2014/0189246 A1 | 7/2014 | Xing et al. | |
| 2014/0189326 A1 | 7/2014 | Leslie et al. | |
| 2014/0267332 A1 | 9/2014 | Chhabra et al. | |
| 2014/0297962 A1* | 10/2014 | Rozas | G06F 12/0808 711/135 |
| 2014/0337983 A1 | 11/2014 | Kang et al. | |
| 2015/0089173 A1 | 3/2015 | Chhabra et al. | |
| 2015/0131919 A1 | 5/2015 | Dewangan et al. | |
| 2015/0200949 A1 | 7/2015 | Willhite et al. | |
| 2016/0036786 A1 | 2/2016 | Gandhi | |
| 2016/0110540 A1 | 4/2016 | Narendra Trivedi et al. | |
| 2016/0147979 A1 | 5/2016 | Kato | |
| 2016/0171248 A1* | 6/2016 | Nesher | G06F 21/53 713/190 |
| 2016/0179702 A1 | 6/2016 | Chhabra et al. | |
| 2016/0219044 A1 | 7/2016 | Karunakaran et al. | |
| 2016/0219060 A1 | 7/2016 | Karunakaran et al. | |
| 2016/0226913 A1* | 8/2016 | Sood | G06F 21/577 |
| 2016/0371540 A1 | 12/2016 | Pabbichetty | |
| 2017/0093572 A1* | 3/2017 | Hunt | G06Q 20/3829 |
| 2017/0185766 A1 | 6/2017 | Narendra Trivedi et al. | |
| 2017/0201380 A1 | 7/2017 | Schaap et al. | |
| 2017/0223080 A1 | 8/2017 | Velayudhan et al. | |
| 2017/0264643 A1 | 9/2017 | Bhuiyan et al. | |
| 2017/0286721 A1 | 10/2017 | King | |
| 2017/0353319 A1 | 12/2017 | Scarlata et al. | |
| 2017/0366359 A1 | 12/2017 | Scarlata et al. | |
| 2018/0059917 A1 | 3/2018 | Takehara | |
| 2018/0113811 A1* | 4/2018 | Xing | G06F 12/1009 |
| 2018/0114013 A1 | 4/2018 | Sood et al. | |
| 2018/0183578 A1* | 6/2018 | Chakrabarti | H04L 9/3247 |
| 2018/0210742 A1* | 7/2018 | Costa | H04L 9/0643 |
| 2018/0211018 A1 | 7/2018 | Yang | |
| 2018/0212971 A1* | 7/2018 | Costa | G06F 21/6209 |
| 2018/0295115 A1 | 10/2018 | Kumar et al. | |
| 2018/0300556 A1 | 10/2018 | Varerkar et al. | |
| 2018/0337920 A1 | 11/2018 | Stites et al. | |
| 2019/0028460 A1 | 1/2019 | Bhargava et al. | |
| 2019/0034617 A1* | 1/2019 | Scarlata | G06F 9/30007 |
| 2019/0044729 A1* | 2/2019 | Chhabra | G06F 12/1408 |
| 2019/0050551 A1 | 2/2019 | Goldman-Kirst et al. | |
| 2019/0058577 A1 | 2/2019 | Bowman et al. | |
| 2019/0058696 A1* | 2/2019 | Bowman | H04L 9/3236 |
| 2019/0103074 A1 | 4/2019 | Chhabra et al. | |
| 2019/0109877 A1 | 4/2019 | Samuel et al. | |
| 2019/0149531 A1 | 5/2019 | Kakumani et al. | |
| 2019/0158474 A1 | 5/2019 | Kashyap et al. | |
| 2019/0163898 A1 | 5/2019 | Clebsch et al. | |
| 2019/0197231 A1 | 6/2019 | Meier | |
| 2019/0245882 A1 | 8/2019 | Kesavan et al. | |
| 2019/0258811 A1 | 8/2019 | Ferraiolo et al. | |
| 2019/0310862 A1 | 10/2019 | Mortensen et al. | |
| 2020/0233953 A1* | 7/2020 | Palsson | G06F 21/53 |

FOREIGN PATENT DOCUMENTS

| | | |
|---|---|---|
| WO | 2014062618 A1 | 4/2014 |
| WO | 2015066028 A1 | 5/2015 |
| WO | 2015094261 A1 | 6/2015 |
| WO | 2016209526 A1 | 12/2016 |

OTHER PUBLICATIONS

International Preliminary Report on Patentability for International Application No. PCT/US2018/042625 dated Nov. 12, 2020. 12 pages.

International Preliminary Report on Patentability for International Application No. PCT/US2018/042684 dated Nov. 12, 2020. 12 pages.

The Next Platform, retrieved from https://www.nextplatform.com/2017/04/05/first-depth-look-googles-tpu-architecture/ (2017).

Google Cloud Platform, retrieved from https://cloudplatform.googleblog.com/2017/08/Titan-in-depth-security-in-plaintext.html (2017).

Jouppi, N., et al., "In-Datacenter Performance Analysis of a Tensor Processing Unit", 44th International Symposium on Computer Architecture (ISCA), (2017) 17 pgs.

McKeen, Frank, et al., "Intel® Software Guard Extensions (Intel® SGX) Support for Dynamic Memory Management Inside an Enclave", Intel Corporation (2016) 9 pgs.

"Proceedings of USENIX ATC '17 2017 USENIX Annual Technical Conference", USENIX, USENIX, The Advanced Computing Systems Association, Jul. 12, 2017 (Jul. 12, 2017), pp. 1-811, XP061023212, [retrieved on Jul. 12, 2017].

International Search Report and Written Opinion for PCT Application No. PCT/US2018/042695, dated Oct. 4, 2018. 16 pages.

Invitation to Pay Additional Fees, Communication Relating to the Results of the Partial International Search, and Provisional Opinion Accompanying the Partial Search Result for PCT Application No. PCT/US2018/042625, dated Oct. 8, 2018. 14 pages.

Invitation to Pay Additional Fees, Communication Relating to the Results of the Partial International Search, and Provisional Opinion

(56) References Cited

OTHER PUBLICATIONS

Accompanying the Partial Search Result for PCT Application No. PCT/US2018/042684, dated Oct. 10, 2018. 14 pages.
International Search Report and Written Opinion for PCT Application No. PCT/US2018/042625, dated Nov. 30, 2018. 19 pages.
International Search Report and Written Opinion for PCT Application No. PCT/US2018/042684, dated Dec. 5, 2018. 19 pages.
First Examination Report for Indian Patent Application No. 202047046012 dated Sep. 17, 2021. 7 pages.
First Examination Report for Indian Patent Application No. 202047046246 dated Dec. 6, 2021. 5 pages.
First Examination Report for Indian Patent Application No. 202047046281 dated Dec. 7, 2021. 6 pages.
Office Action for European Patent Application No. 18750026.9 dated May 9, 2022. 6 pages.
M. M. Ozdal, "Emerging Accelerator Platforms for Data Centers," in IEEE Design & Test, vol. 35, No. 1, pp. 47-54, Feb. 2018 (Year: 2018).
Office Action for European Patent Application No. 18753285.8 dated Jul. 5, 2022. 8 pages.

\* cited by examiner

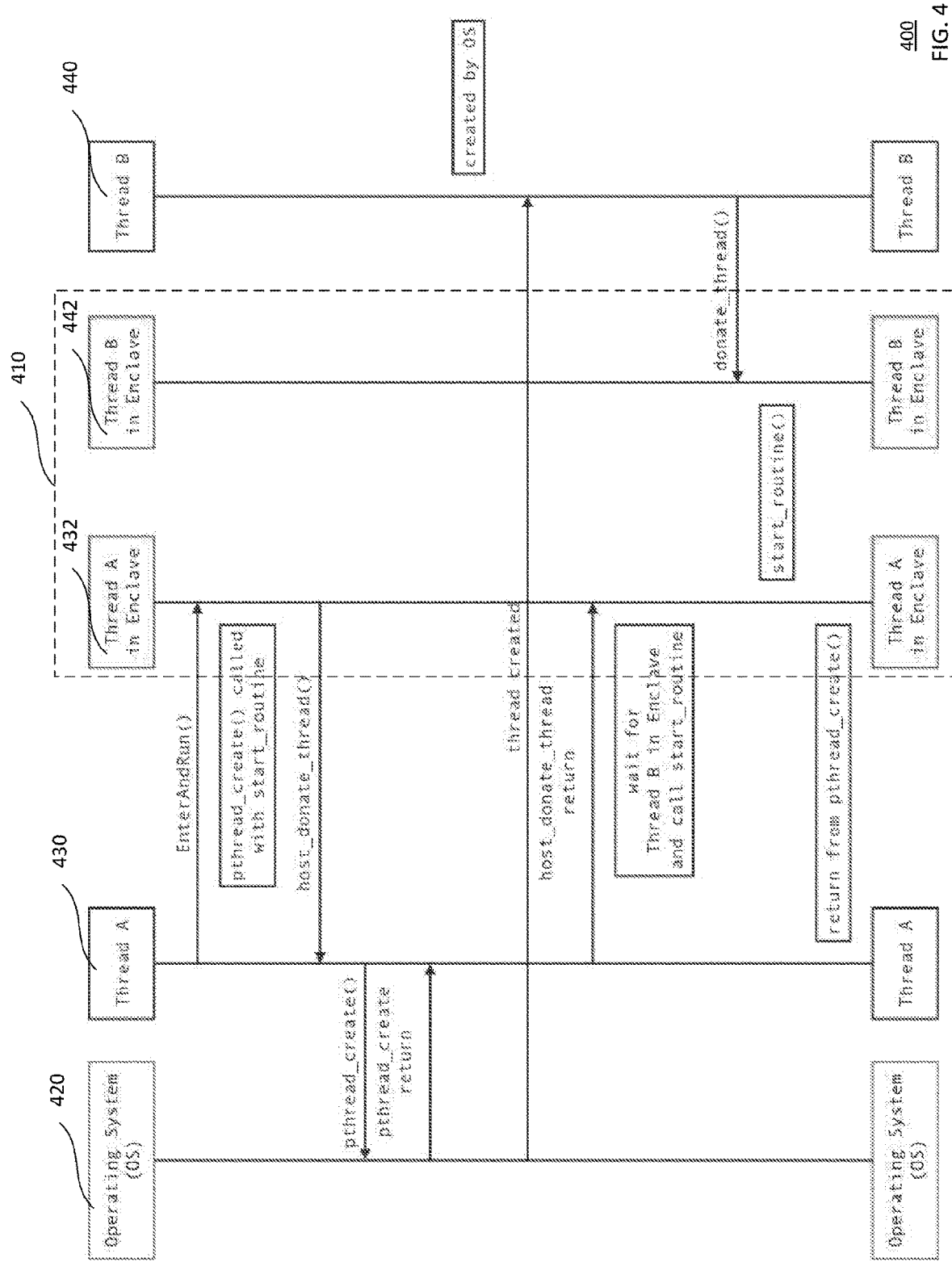

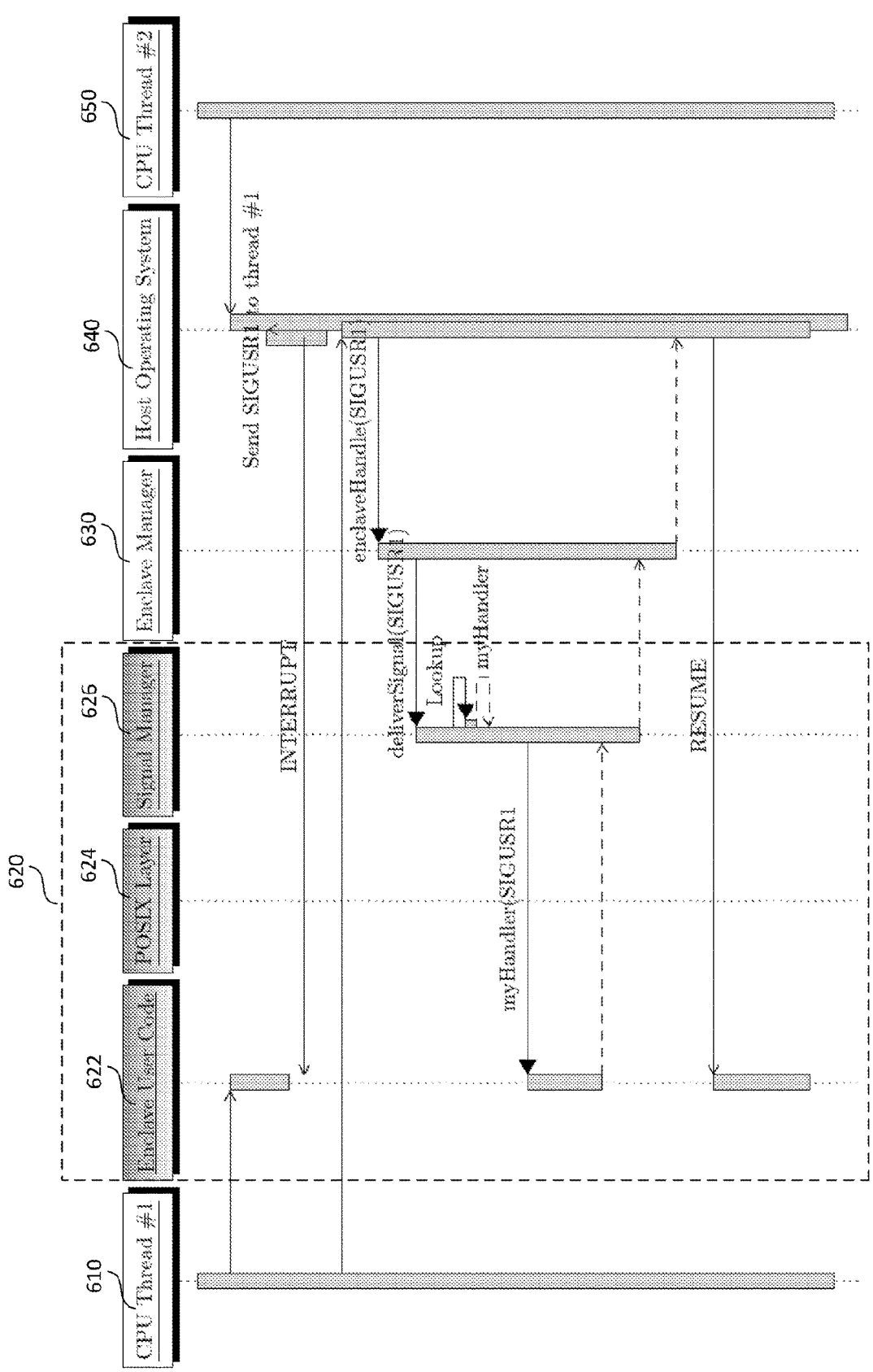

UNIFORM ENCLAVE INTERFACE

CROSS-REFERENCE TO RELATED APPLICATION

The present application is a national phase entry under 35 U.S.C. § 371 of International Application No. PCT/US2018/042625, filed Jul. 18, 2018, which claims the benefit of the filing date of U.S. Provisional Application No. 62/664,438, filed Apr. 30, 2018, the disclosure of which is hereby incorporated herein by reference.

BACKGROUND

Software applications may store sensitive data such as passwords, account numbers, financial and health records. Various safeguards may be used to protect such sensitive data, for example, a host operating system may prevent unauthorized users from accessing operating system resources, and the application may encrypt sensitive data, but the application has no safeguard against processes having higher privileges, including the host operating system itself. Secured execution technologies provide the capability to run applications without requiring trust in the system administrator or the system software itself, such as a host operating system or hypervisor. In order to do so, a secured execution technology may create an enclave—a protected environment in which the data within the enclave is isolated from the rest of the system. Code and data inside an enclave are not visible and cannot be manipulated by untrusted processes outside the enclave, and the only way to communicate from within the enclave with the unsecured environment outside the enclave is by sending and receiving messages.

BRIEF SUMMARY

One aspects of the disclosure provides a method for creating trusted applications stored in memory of a host computing device. The method includes creating, by one or more processors of the host computing device, an enclave manager in an untrusted environment of the host computing device, the enclave manager including instructions for creating one or more enclaves; generating, by the one or more processors, an enclave in memory of the host computing device using the enclave manager; generating, by the one or more processors, one or more enclave clients of the enclave by the enclave manager such that the one or more enclave clients configured to provide one or more entry points into the enclave; and creating, by the one or more processors, one or more trusted application instances in the enclave.

In one example, the entry points include a plurality of different functions. In this example, the plurality of different functions include one or more of an initialize function, a finalize function, a run function, a donate thread function, a handle signal function, and a destroy function. In addition, the initialize function allows the one or more enclave clients to take system resources to run the one or more trusted application instances. In addition or alternatively, the finalize function allows the one or more enclave clients to relinquish system resources. In addition or alternatively, the run function allows the one or more enclave clients to execute functions of the one or more trusted application instances. In addition or alternatively, the donate thread function allows the one or more enclave clients to have an operating system of the host computing device provide a thread to enter the enclave. In addition or alternatively, the handle signal function allows the one or more enclave clients handle signals sent to the one or more trusted application instances. In addition or alternatively, the destroy function allows the one or more enclave clients to terminate the enclave.

In another example, the one or more enclave clients are further configured to allow code to run in the enclave. In another example, generating the enclave includes using an application having a trusted application designation. In another example, the method also includes using the enclave manager to maintain a hierarchical namespace by binding the enclave to an identifier in the hierarchical namespace. In this example, the one or more trusted application instances includes code that stores sensitive data of an application running in the untrusted environment. In addition or alternatively, the enclave manager is created by the application. In addition or alternatively, the one or more trusted application instances includes code that executes the sensitive data of the application. In another example, the method also includes using the enclave manager to provide platform services including a software-based clock. In another example, the enclave is generated in a system having an isolation kernel and isolation capable hardware. In another example, the enclave is generated in a system having hardware secure execution primitives and isolation capable hardware. In another example, the enclave is generated in a system having a hardware secure element. In another example, enclave is generated in a system remote from the untrusted environment.

Another aspect of the disclosure provides a method for handling threads of execution using an enclave stored in memory of a host computing device. The method includes receiving, by one or more processors, from an application running in the enclave, a request for a new thread of execution for a function of the application; adding, by the one or more processors, the request for a new thread to a queue of requests the request; requesting, by one or more processors, host software of the host computing device to create the new thread requested by the function in the enclave based on the queue of requests; and allowing, by one or more processors, the new thread to enter the enclave.

In one example, the host software includes a host operating system. In another example, the host software includes a host hypervisor. In another example, the method also includes entering a first thread into the enclave, wherein entering the first thread triggers the request for the new thread and the first thread requires the functionality of the enclave in order to accomplish a task. In another example, the queue of requests is maintained by runtime functionality of the enclave as metadata. In another example, the method also includes using metadata of the enclave to track the function, an argument for the function, and a return value for the new thread. In another example, the method also includes using metadata of the enclave to track a status of the new thread in order to allow the application to access a return value for the new thread. In this example, the method also includes using the host software to send the return value for the thread to the new thread.

In another example, the method also includes allowing the new thread to exit the enclave and, in response to receiving a request form the new thread for a second new thread, using the host software create the second new thread outside of the enclave. In this example, the method also includes after the new thread has exited the enclave, allowing the new thread to enter the enclave and allowing the second new thread to enter the enclave. In addition or alternatively, the method also includes using the queue of request to identify a second function, executing the second function in the enclave using the second new thread to obtain a return value, and allowing the second new thread to exit the enclave after executing the second function. In addition or alternatively, after allowing the second new thread to enter the enclave, determining that the queue of requests is empty and based on the determination, allowing the second new thread to exit the enclave. In addition or alternatively, after allowing the second new thread to enter the enclave, determining that the queue of requests is empty and based on the determination, tearing down the enclave.

In another example, the method also includes creating the queue of requests in metadata of the enclave using runtime functionality of the enclave. In another example, the method also includes updating the queue of requests as the application running in the enclave sends new requests for additional thread of execution for one or more functions of the application. In another example, the new thread is configured to enter the enclave and execute the function. In another example, the enclave is implemented in a system having an isolation kernel and isolation capable hardware. In another example, the enclave is implemented in a system having hardware secure execution primitives and isolation capable hardware. In another example, the method also includes generating the enclave in a system having a hardware secure element. In another example, the enclave is implemented in a system remote from the untrusted environment.

Another aspect of the disclosure provides a method for handling file operations for files of an enclave stored in memory of a host computing device. The method includes receiving, by one or more processors of the host computing device, a request from a function in an enclave to perform a file operation at a file path; delegating, by the one or more processors, the file operation to a host; translating, by the one or more processors, a value of a flag of the file path into a native value of the host computing device for the flag; and forwarding, by the one or more processors, the file path to an enclave manager outside the enclave for further forwarding to host software of the host computing device.

In one example, the file path indicates that the file is in a host access domain configured for handling non-sensitive data available and modifiable by other untrusted software running on the host computing device. In this example, the flag indicates that the file in the host access domain is handled as if in the secure access domain configured for handling encrypted and/or signed data. In addition or alternatively, the method also includes using the file path to determine whether to delegate the file operation to the host software. In another example, the method also includes using the enclave manager to request that the host software opens a file at the file path. In this example, the method also includes receiving, using the enclave manager, a file descriptor from the host software for the file and translating a value of the file descriptor from a native value of the host computing device for the file descriptor into a new value for use inside of the enclave. In addition, the method also includes using a registry to track a mapping between the native value for the file descriptor and the new value. In this example, translating the value of the file descriptor is based on the registry.

In another example, the method also includes using a registry to track a mapping between the native value for the flag and an pre-translation value of the flag for use within the enclave. In this example, translating the value of the flag is based on the registry. In addition or alternatively, the file path indicates that the file is in a secure access domain configured for handling encrypted and/or signed data. In addition or alternatively, the file path indicates that the file is in a virtual memory access domain not backed by persistent storage. In another example, the method also includes adding a prefix to the file path, and wherein the file path forwarded to the enclave manager is the prefixed file path. In another example, the host software includes a host operating system. In another example, the host software includes a host hypervisor. In another example, the method also includes generating the enclave manager outside of the enclave, and the enclave manager includes instructions for creating one or more enclaves. In another example, the method also includes generating the enclave in a system having an isolation kernel and isolation capable hardware. In another example, the method also includes generating the enclave in a system having hardware secure execution primitives and isolation capable hardware. In another example, the method also includes the enclave in a system having a hardware secure element. In another example, the method also includes generating the enclave in a system remote from the untrusted environment.

Another aspect of the disclosure provides a method for handling signals delivered from host software to an enclave stored in memory of a host computing device. The method includes receiving, by one or more processors of the host computing device, a signal at the enclave; in response to receiving the signal, mapping, by the one or more processors, a user-defined signal handler in the enclave to the received signal; sending, by the one or more processors, the mapping to an enclave manager outside of the enclave; generating, by the one or more processors, using the enclave manager instructions indicating that when the signal is received by the host software, the host software must send a host signal function into the enclave to find the user-defined signal handler in order to handle the signal inside of the enclave; and sending the instructions to the host software.

In one example, the method also includes using an enclave manager and the mapping to define a function for the user-defined signal handler outside of the enclave. In another example, the method also includes translating a host value for the signal to an enclave value for the signal for use when the signal is within the enclave. In this example, the translating also includes translating the host value for the signal to a bridge value for signal outside of the enclave and when the signal enters the enclave, translating the bridge value into an enclave value for use when the signal is within the enclave. In another example, the method also includes translating a host value for the signal to an enclave value for the signal for use when the signal is outside of the enclave. In this example, the translating also includes, before the signal is allowed to leave the enclave, translating the enclave value to a bridge value and when the signal has left the enclave, translating the bridge value into the host value for use when the signal is outside of the enclave.

In another example, the method also includes receiving, at the host software, the signal; in response to receiving the signal at the host software, using the instructions to identify the host signal function; and using the host signal function to find the user-defined signal handler in order to handle the signal inside of the enclave. In this example, if the user-defined signal handler is not found, ignoring the signal received at the host software. In another example, the signal is received at the enclave from outside of the enclave. In another example, the method also includes sending, by the enclave, the signal to the enclave manager in order to send the signal to a second enclave. In this example, the method also includes upon receipt of the signal at the enclave manager, using the enclave manager to forward a function to the host software, in response to receiving the function using the host software, interrupting code running in the second enclave and sending a signal to a signal manager of the second enclave to establish a secure channel with the enclave, and sending the signal to the second enclave over the secure channel. In this example, the method also includes finding the user-defined signal handler in order to handle the signal inside of the second enclave. In addition or alternatively, the method also includes, after the signal is handled, resuming the interrupted code.

In another example, the host software includes a host operating system. In another example, the host software includes a host hypervisor. In another example, the method also includes generating the enclave manager outside of the enclave, and the enclave manager includes instructions for creating one or more enclaves. In another example, the method also includes generating the enclave in a system having an isolation kernel and isolation capable hardware. In another example, the method also includes generating the enclave in a system having hardware secure execution primitives and isolation capable hardware. In another example, the method also includes generating the enclave in a system having a hardware secure element. In another example, the method also includes generating the enclave in a system remote from the untrusted environment.

BRIEF DESCRIPTION OF THE DRAWINGS

FIG. 4 is an example timing diagram according to aspects of the disclosure.

FIGS. 6A-C are example timing diagrams according to aspects of the disclosure.

DETAILED DESCRIPTION

Overview

Figure 1:
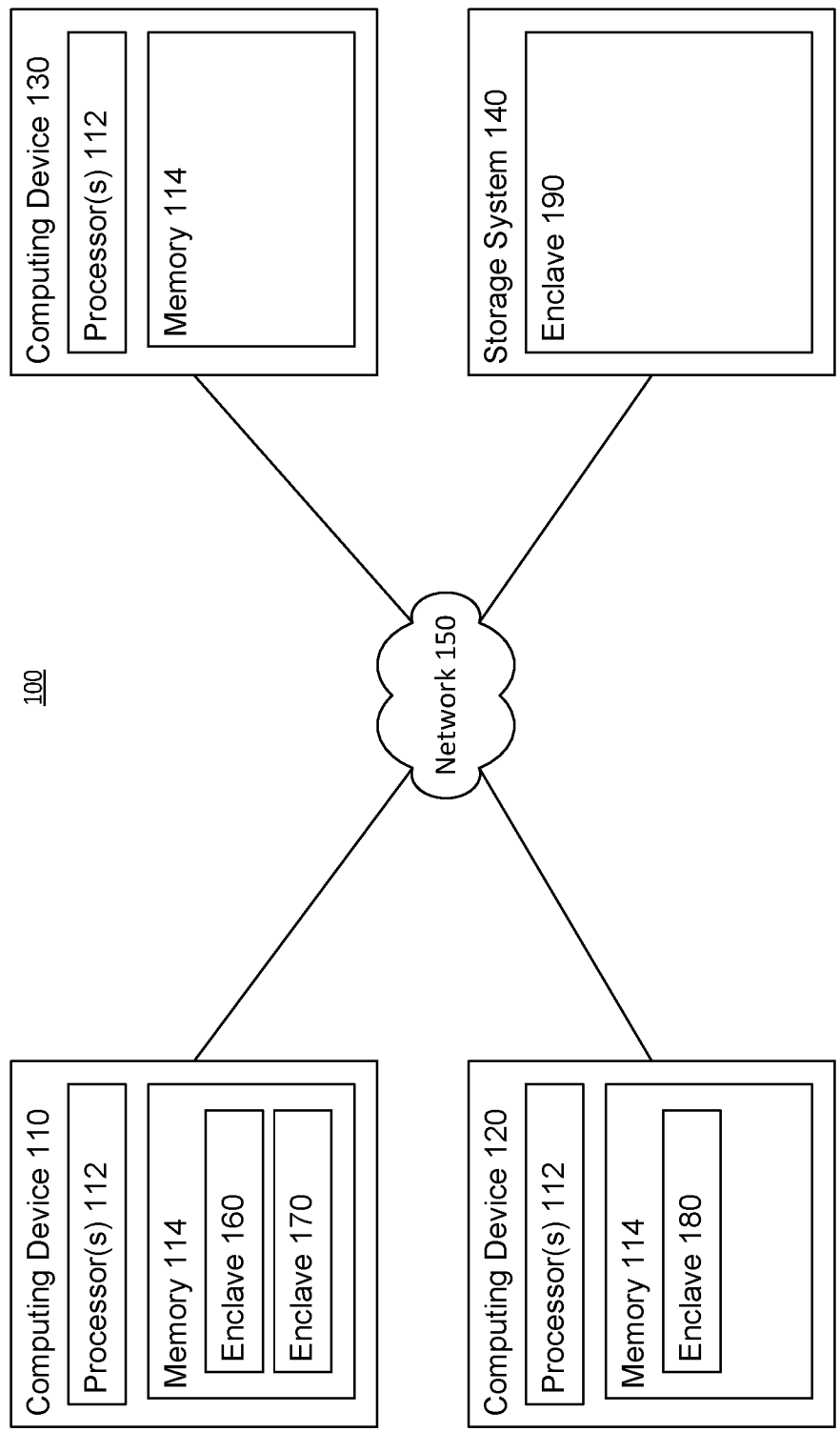
FIG. 1 is a block diagram illustrating an example system according to aspects of the disclosure.

The technology generally relates to a uniform enclave interface. Secured execution technologies may differ significantly from vendor to vendor in their backend implementations. For instance, enclaves may be supported by different application programming interfaces, applications, and system software (for instance, different operating systems) running on different types of hardware and/or machines. Therefore, for an application to take advantage of the protected environment of a particular secured execution technology backend, the application would need to be designed specifically for the particular secured execution technology, operating system, and in some instances, hardware, backend. The uniform enclave interface described herein implements an abstract set of security guarantees based on which the programmers or users may write software without taking account of how the secured technology is implemented on a particular backend implementation. In other words, the features described herein may be implemented using various different application programming interfaces, applications, and system software (for instance, different operating systems) running on different types of hardware and/or machines and effectively "hide" these details and differences from a user writing software using the uniform enclave interface.

The uniform enclave interface may provide a framework to enable code and data to be securely stored and/or run inside enclaves. The framework may include several basic components, such as an enclave manager, one or more enclave clients, and one or more trusted applications. The enclave manager may be in an untrusted environment and may be configured to create enclaves and enclave clients. The enclave clients may be configured to provide limited entry points for code to enter and exit the enclaves. The trusted applications may be base classes configured to allow users to augment with custom logic handling inside the enclave, resulting in trusted user application instances that can securely run inside the enclave.

Enclaves often are not implemented with a full-fledged operating system and therefore cannot complete certain tasks necessary for running trusted user application instances. In this regard, the uniform enclave interface may provide additional features to enable trusted user application instances to run securely inside the enclaves.

Thread creation and scheduling features may be implemented in the uniform enclave interface. In this regard, when a function inside an enclave requests a new thread, an enclave runtime may exit the enclave to request that the host create a new thread. A queue of new thread requests may be kept inside the enclave. After the host creates the new thread, the enclave runtime re-enters the enclave and waits for the new thread to also enter the enclave. Once the new thread enters the enclave, it checks the queue of new thread requests to execute the function that requested it. When the new thread returns from the function that requested it, it saves the return value and exits the enclave.

File operation features may also be implemented in the uniform enclave interface. In this regard, file paths are separated into access domains having different security properties. A file path may be designated with a path prefix to indicate that the file path belongs to a particular access domain. For example, for file paths in a host access domain containing non-sensitive data, an IO manager inside the enclave may delegate file operations on such file paths directly to the host. For another example, for file paths in a secure access domain containing encrypted or signed data, the IO manager may still delegate the file operations on such file paths to the host, but does not give the host access to cryptographic keys stored inside the enclave such that the host may not access decrypted/unsigned data. For yet another example, for file paths in a virtual memory device domain containing highly sensitive data, the IO manager may not delegate file operations on such file paths to the host at all, rather, the IO manager directly instructs CPU hardware to perform the file operations.

Signal handling features may also be implemented in the uniform enclave interface. In this regard, a framework is provided such that a user may register a signal and a user-defined signal handler for the signal inside the enclave. The signal is also registered on the host with a corresponding host signal handler configured to identify the enclave where the corresponding user-defined signal handler is, enter the enclave, and find and call the corresponding user-defined signal handler to handle the signal. In addition, for signals sent between two enclaves, a remote procedure call ("RPC") may be established between the two enclaves to ensure secure delivery even if the host is hostile.

Example Systems

FIG. 1 includes an example enclave system 100 in which the features described herein may be implemented. It should not be considered as limiting the scope of the disclosure or usefulness of the features described herein. In this example, enclave system 100 can include computing devices 110, 120, 130 and storage system 140 connected via a network 150. Each computing device 110, 120, 130 can contain one or more processors 112, memory 114 and other components typically present in general purpose computing devices.

Although only a few computing devices and a storage systems are depicted in the system 100, the system may be expanded to any number of additional devices. In addition to a system including a plurality of computing devices and storage systems connected via a network, the features described herein may be equally applicable to other types of devices such as individual chips, including those incorporating System on Chip (SoC) or other chips with memory, that may include one or more enclaves.

Memory 114 of each of computing devices 110, 120, 130 can store information accessible by the one or more processors 112, including instructions that can be executed by the one or more processors. The memory can also include data that can be retrieved, manipulated or stored by the processor. The memory can be of any non-transitory type capable of storing information accessible by the processor, such as a hard-drive, memory card, ROM, RAM, DVD, CD-ROM, write-capable, and read-only memories.

The instructions can be any set of instructions to be executed directly, such as machine code, or indirectly, such as scripts, by the one or more processors. In that regard, the terms "instructions," "application," "steps," and "programs" can be used interchangeably herein. The instructions can be stored in object code format for direct processing by a processor, or in any other computing device language including scripts or collections of independent source code modules that are interpreted on demand or compiled in advance. Functions, methods, and routines of the instructions are explained in more detail below.

Data may be retrieved, stored or modified by the one or more processors 112 in accordance with the instructions. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The one or more processors 112 can be any conventional processors, such as a commercially available CPU. Alternatively, the processors can be dedicated components such as an application specific integrated circuit ("ASIC") or other hardware-based processor. Although not necessary, one or more of computing devices 110 may include specialized hardware components to perform specific computing processes, such as decoding video, matching video frames with images, distorting videos, encoding distorted videos, etc. faster or more efficiently.

Although FIG. 1 functionally illustrates the processor, memory, and other elements of computing device 110 as being within the same block, the processor, computer, computing device, or memory can actually comprise multiple processors, computers, computing devices, or memories that may or may not be stored within the same physical housing. For example, the memory can be a hard drive or other storage media located in housings different from that of the computing devices 110. Accordingly, references to a processor, computer, computing device, or memory will be understood to include references to a collection of processors, computers, computing devices, or memories that may or may not operate in parallel. For example, the computing devices 110 may include server computing devices operating as a load-balanced server farm, distributed system, etc. Yet further, although some functions described below are indicated as taking place on a single computing device having a single processor, various aspects of the subject matter described herein can be implemented by a plurality of computing devices, for example, communicating information over network 150.

Each of the computing devices 110, 120, 130 can be at different nodes of a network 150 and capable of directly and indirectly communicating with other nodes of network 150. Although only a few computing devices are depicted in FIG. 1, it should be appreciated that a typical system can include a large number of connected computing devices, with each different computing device being at a different node of the network 150. The network 150 and intervening nodes described herein can be interconnected using various protocols and systems, such that the network can be part of the Internet, World Wide Web, specific intranets, wide area networks, or local networks. The network can utilize standard communications protocols, such as Ethernet, WiFi and HTTP, protocols that are proprietary to one or more companies, and various combinations of the foregoing. Although certain advantages are obtained when information is transmitted or received as noted above, other aspects of the subject matter described herein are not limited to any particular manner of transmission of information.

Like the memory discussed above, the storage system 140 may also store information that can be accessed by the computing devices 110, 120, 130. However, in this case, the storage system 140 may store information that can be accessed over the network 150. As with the memory, the storage system can include any non-transitory type capable of storing information accessible by the processor, such as a hard-drive, memory card, ROM, RAM, DVD, CD-ROM, write-capable, and read-only memories.

In this example, the instructions of each of computing devices 110, 120, 130 may include one or more applications. These applications may define enclaves 160, 170, 180, 190 within memory, either locally at memory 114 or remotely at the storage system 140. Each enclave may be "hosted" by the hardware on which the enclave is stored and the software, including operating system software, which is executed on the host computing device. For instance, computing device 110 may be a host computing device for enclaves 160 and 170, and computing device 120 may be a host computing device of enclave 180. In addition, each of enclaves 160, 170, 180 and 190 may be implemented using or on various different application programming interfaces, applications, and system software running on different types of machines (i.e. different types of computing devices). As an example, computing devices 110 and 120 may be different types of machines, running different applications and software with different security protocols, running different operating systems, using different hardware devices. Similarly, enclaves 160, 170, 180 and 190 may each be backed or created by different application programming interfaces and/or applications with different system configurations.

Each enclave can be used to store data and instructions while at the same time limit the use of such data and instructions by other applications. For instance the data may include sensitive information such as passwords, credit card data, social security numbers, or any other information that a user would want to keep confidential. And, as discussed further below, the instructions may be used to limit the access to such data. Although computing device 110 includes only two enclaves, computing device 120 includes only 1 enclave, computing device 130 includes no enclaves, and storage system 140 includes only 1 enclave, any number of enclaves may be defined with the memory of the computing devices 110, 120 or storage system 140.

Figure 2:
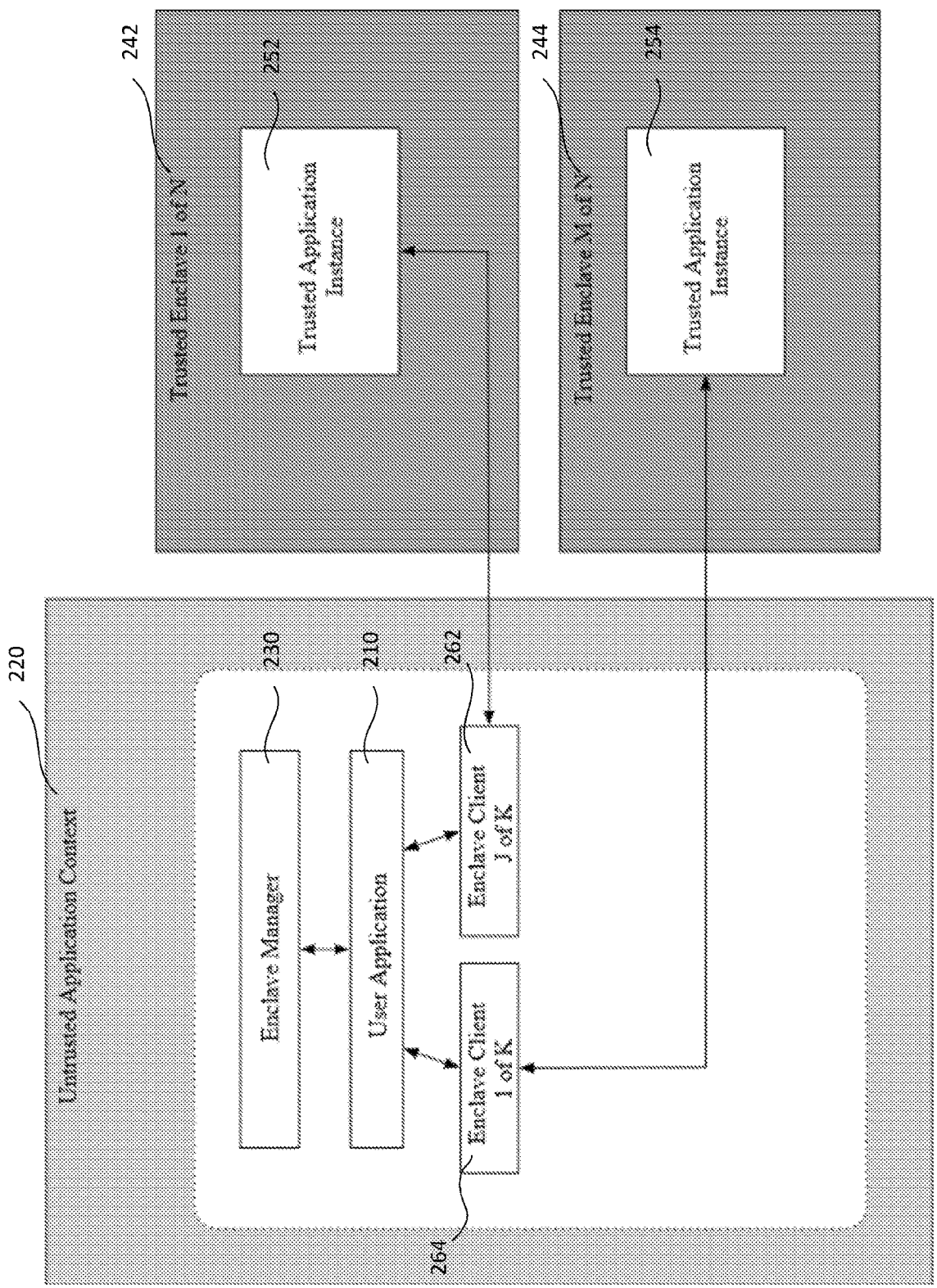
FIG. 2 is a block diagram illustrating an example system according to aspects of the disclosure.

FIG. 2 shows an example uniform enclave interface 200 for any of enclaves 160, 170, 180, or 190. Thus, the uniform enclave interface 200 may be implemented in a memory on a processor of a computing device, for example, such as in memory 114 of computing devices 110 and 120 shown in FIG. 1. As shown, User Application 210 is running in an Untrusted Application Context 220, which is vulnerable to manipulations by processes having higher privileges, such as an operating system or a hypervisor. However, the User Application 210 may have certain components that require greater protection than others. For example, the User Application may be a password manager application that has a key vault component. Such components may be stored and/or executed in enclaves, while other components of the application may be stored and/or executed in an untrusted environment or rather, outside of the enclave. In this regard, the User Application 210 may create an Enclave Manager 230 for the User Application 210 in the Untrusted Application Context 220. The Enclave Manager 230 may include instructions for creating one or more enclaves and may be implemented in any of a number of different ways, for example, as object code running in a single process, as code stored in a library, or as an RPC service.

The Enclave Manager 230 may create one or more enclaves, such as Trusted Enclave 1 of N 242 and Trusted Enclave M of N 244, where N is the total number of enclaves generated by the Enclave Manager 230. In each of the enclaves created by the Enclave Manager 230, a trusted application instance, such as Trusted Application Instance 252 and Trusted Application Instance 254, may be stored and/or executed. For example, Trusted Application Instance 252 and Trusted Application Instance 254 may be two different sets of codes that stores and/or executes sensitive data of User Application 210, or copies of the same code that stores and/or executes sensitive data of User Application 210.

The framework provided by the uniform enclave interface may define an abstraction that allows users to concretize with specific instructions. In this regard, the uniform enclave interface may define a "Trusted Application," which is the base class for all user enclaves, such as Trusted Enclave 1 of N 242 and Trusted Enclave M or N 244. Users of the uniform enclave interface can then extend this abstract base class by augmenting with custom logic handling to create "Trusted User Applications" that perform specific functions defined by the user. For example, Trusted Application Instance 252 and Trusted Application Instance 254 are trusted user applications defined by the user using the Trusted Application abstract base class.

The Enclave Manager 230 may create Trusted Enclave 1 of N 242 and Trusted Enclave M of N 244 on the same backend, on two backends of a same type, or on two backends of different types. In this regard, the enclave manager may have features that enable implementation of enclaves across multiple different and/or different types of backends. For instance, the Enclave Manager 230 may be configured to bind enclaves to identifiers or names in a namespace. For example, the Enclave Manager 230 may bind each enclave instance it creates, such as Trusted Enclave 1 of N 242 and Trusted Enclave M of N 244, to a name in a common, hierarchical namespace. This way, a uniform reference may be made to loaded enclaves regardless of differences in enclave identifiers due to particular implementations. For another instance, since not all backends make available all platform resources to an enclave, the enclave manager may also provide platform services to enclaves. For example, the Enclave Manager 230 may implement a clock via software for an Intel SGX backend, since a high-frequency hardware clock is not provided by Intel SGX.

The Enclave Manager 230 may also generate one or more enclave clients to provide entry points for code to enter and exit the enclaves. Enclave clients are handles that allow code to run in an enclave. As shown, Enclave Manager 230 creates Enclave Client J of K 262 to provide entry points for Trusted Enclave 1 of N 242, and Enclave Client 1 of K 264 to provide entry points for Trusted Enclave M of N 244, where K is the total number of enclave clients generated by the Enclave Manager 230. Both Enclave Client J of K 262 and Enclave Client 1 of K 264 are in the Untrusted Application Context 220, and provide an interface between the User Application 210 and Trusted Application Instance 252 and Trusted Application Instance 254.

The entry points may include any number of different functions, such as "enter and initialize," "enter and finalize," "enter and run," "enter and donate thread," "enter and handle signal," and "enter and destroy." As such, these functions, such as "enter and run," "enter and donate thread," etc. may be interfaces of one or more enclave clients generated by an Enclave Manager, such as an Enclave Manager 230. For instance, Enclave Client J of K 262 may use "enter and initialize" to send code into Trusted Enclave 1 of N 242 to take system resources required to run the Trusted Application Instance 252, and to provide configuration data to the Trusted Enclave 1 of N 242. Enclave Client J of K 262 may use "enter and finalize" to relinquish let go of the system resources in Trusted Enclave 1 of N 242 that is no longer needed. Enclave Client J of K 262 may use "enter and run" to execute functions of the Trusted Application Instance 252. Enclave Client J of K 262 may use "enter and donate thread" to have the operating system provide a thread to enter into the Trusted Enclave 1 of N 242. When the Trusted Application Instance 252 wants to send a signal (for instance to another enclave, a particular thread within the enclave, a process outside of the enclave, to the signal's own thread, etc.), or when a signal is sent to the Trusted Application Instance 252, Enclave Client J of K 262 may use "enter and handle signal" to handle the signal. When Enclave Client J of K 262 is no longer needed, Enclave Client J of K 262 may use "enter and destroy" to terminate Trusted Enclave 1 of N 242. The actual implementation details of such functions may be specific to the features of the backend in which the enclave is operating.

As noted above, the uniform enclave interface 200 may be used for enclaves implemented across any of a number of different types of application programming interfaces, applications, and system software (for instance, different operating systems) running on different types of machines. As such, the uniform enclave interface may also support any number of different types of security architectures and system configurations, such as the example configurations shown in FIGS. 3A-D. For example, Trusted Enclave 1 of N 242 and Trusted Enclave M of N 244 may be implemented as Trusted Enclave 314 shown in any of FIGS. 3A-D. In addition, trusted enclave 314 may represent any of enclaves 160, 170, 180 and 190. Each of the example system configurations may be implemented on a computing device, for example, such as computing device 110 shown in FIG. 1.

Figure 3A:
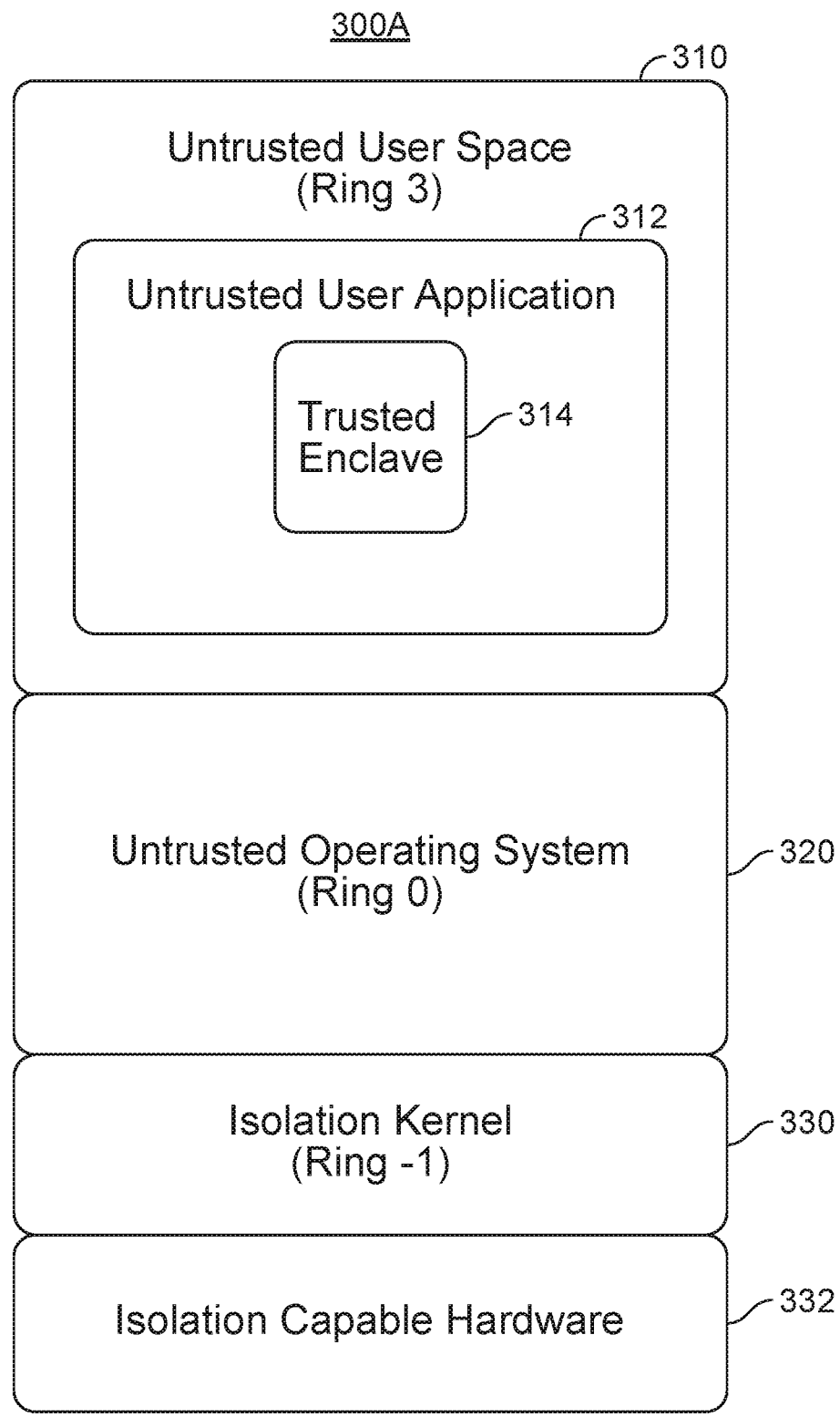
FIGS. 3A-D are block diagrams illustrating example system configurations according to aspects of the disclosure.

FIG. 3A shows an example system configuration 300A. An Untrusted User Application 312 is running in Untrusted User Space 310. Since Untrusted User Space 310 is on Ring 3 and Untrusted Operating System 320 is on Ring 0, the Untrusted Operating System 320 has higher privileges and therefore would be able to manipulate Untrusted User Application 312. To prevent the Untrusted Operating System 320 from accessing certain sensitive data of the Untrusted User Application 312, a Trusted Enclave 314 is created. In this regard, an Isolation Kernel 330 uses Isolation Capable Hardware 332 to isolate system resources for Trusted Enclave 314. The Isolation Kernel 330 is a Hypervisor on Ring −1, which could control Ring 0 hardware access. For example, hardware features such as virtualization support (for instance, Intel VMX or AMD-V) may be used.

Figure 3B:
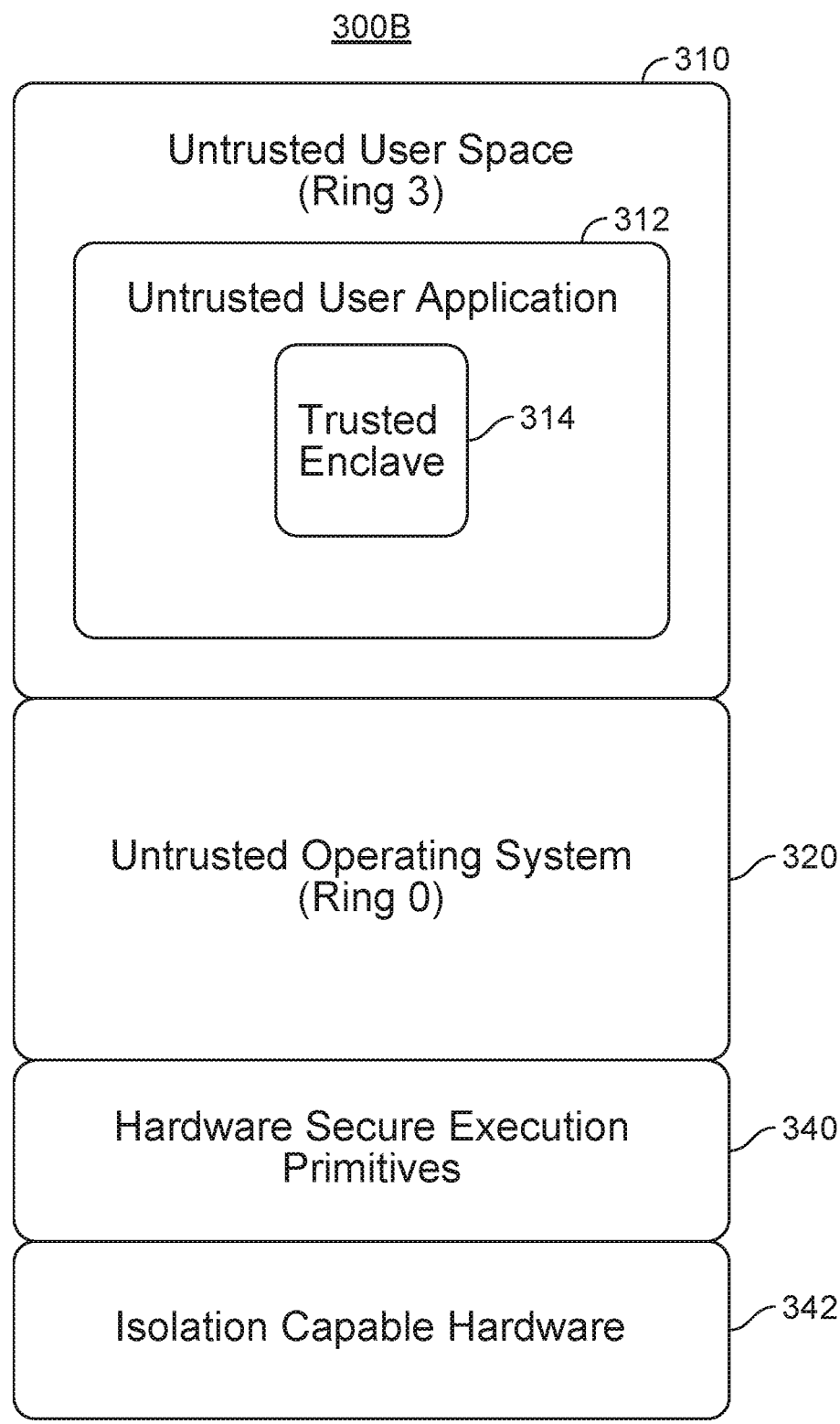

FIG. 3B shows an example system configuration 300B. Untrusted User Application 312 is running in Untrusted User Space 310 (Ring 3), and to prevent the Untrusted Operating System 320 (Ring 0) from accessing certain sensitive data of the Untrusted User Application 312, a Trusted Enclave 314 is created. In the example system configuration 300B, however, Hardware Secure Execution Primitives 340 use Isolation Capable Hardware 342 to isolate system resources for Trusted Enclave 314. For example, Hardware Secure Execution Primitives 340 could be or include Intel SGX or ARM TrustZone.

Figure 3C:
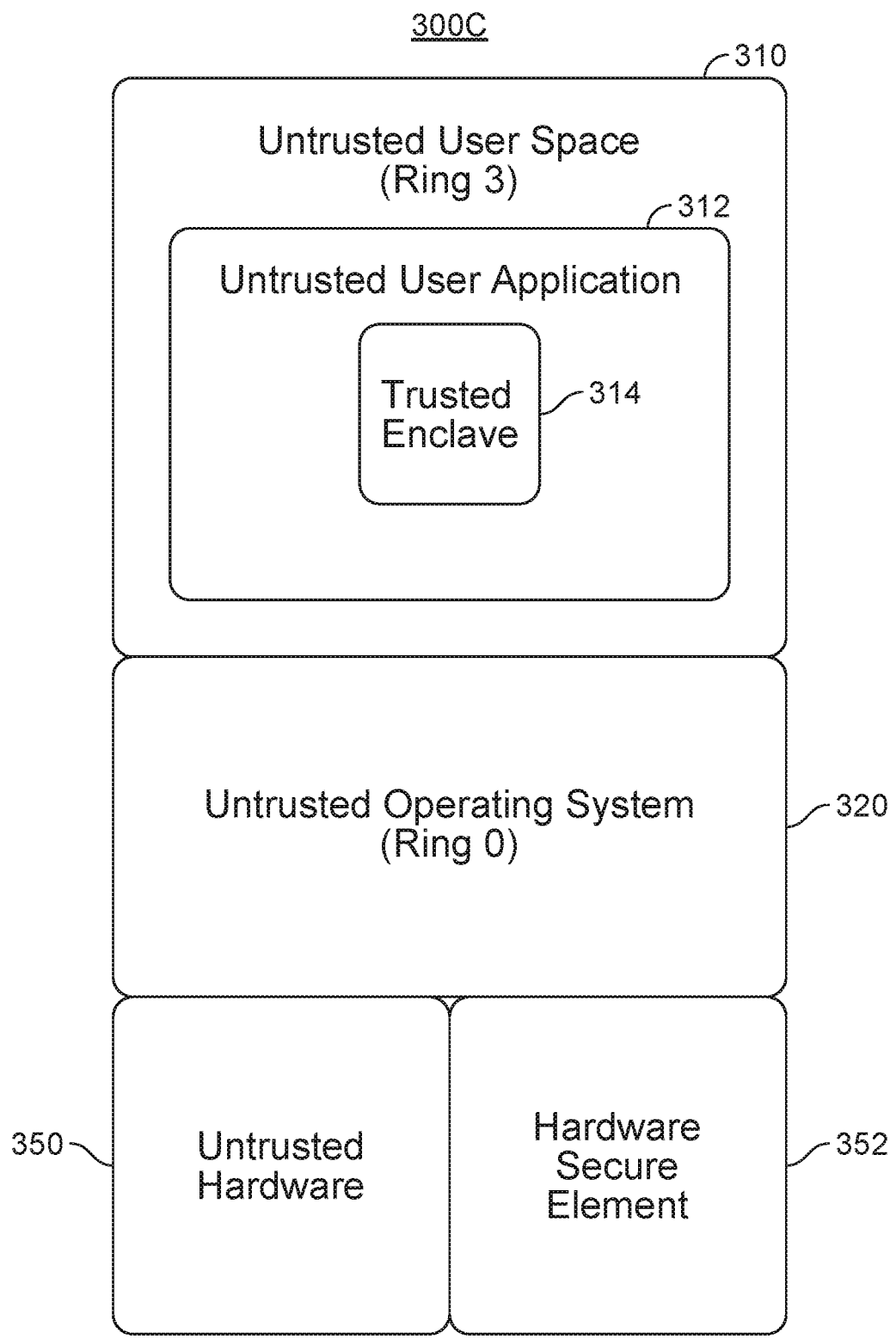

FIG. 3C shows an example system configuration 300C. Untrusted User Application 312 is shown running in Untrusted User Space 310 (Ring 3), and to prevent the Untrusted Operating System 320 (Ring 0) from accessing certain sensitive data of the Untrusted User Application 312, a Trusted Enclave 314 is created. The example system configuration 300C is implemented using a Hardware Secure Element 352 that is physically separate from Untrusted Hardware 350. For instance, this example backend may be implemented using an embedded secure system-on-a-chip co-processor.

Figure 3D:
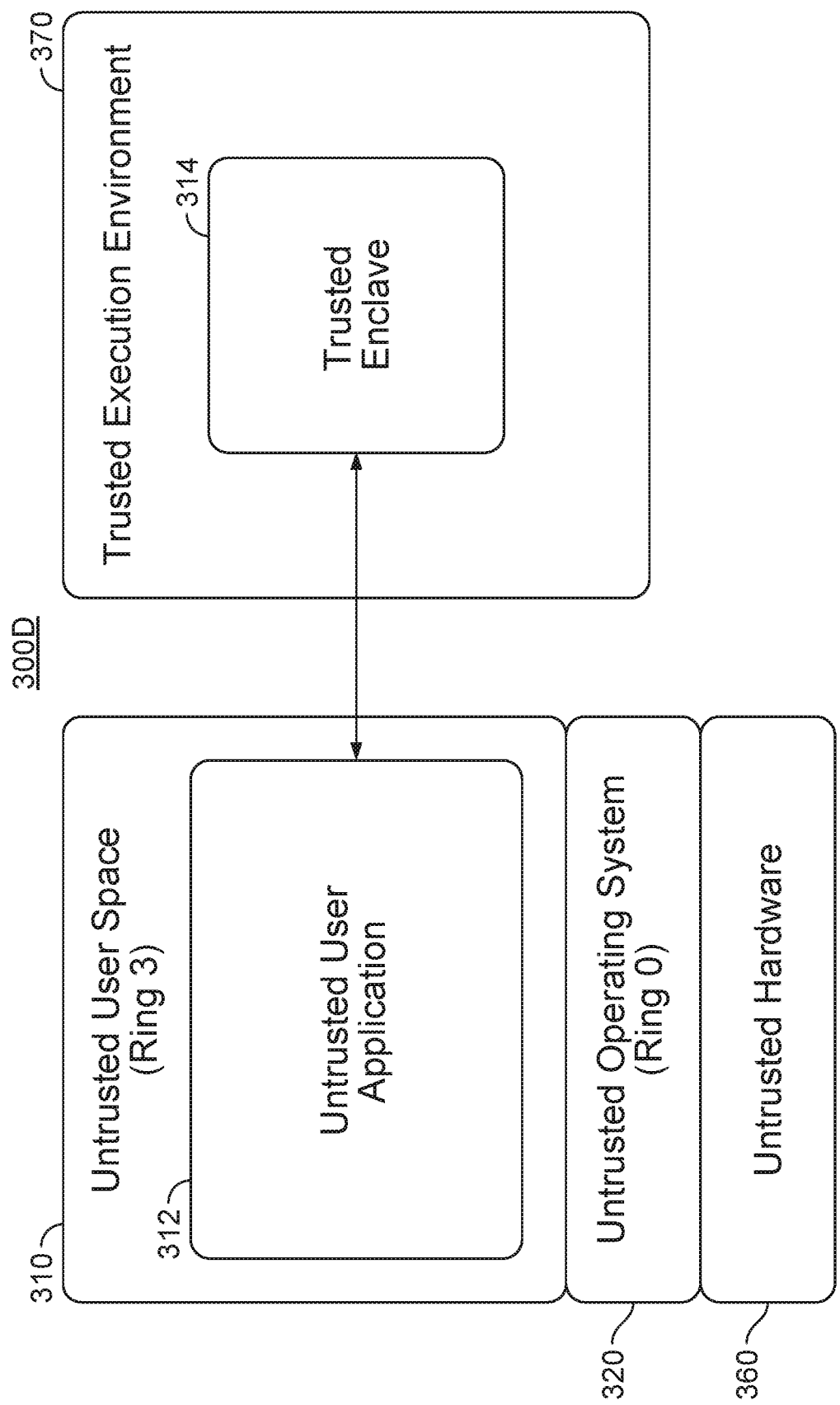

FIG. 3D shows an example system configuration 300D. Untrusted User Application 312 is running in Untrusted User Space 310 (Ring 3), and to prevent the Untrusted Operating System 320 (Ring 0) from accessing certain sensitive data of the Untrusted User Application 312, a Trusted Enclave 314 is created. In this example, the Trusted Enclave 314 is implemented on a Trusted Execution Environment 370 that is remote from Untrusted Hardware 360. For instance, the Trusted Execution Environment 370 may be located on a trusted computing device in a network.

Enclaves often are not implemented with a full-fledged operating system and therefore cannot complete certain tasks necessary for running a trusted application instance inside an enclave. For example, an application programming interface of the backend may not be able to implement CPU scheduling or resource allocation. Thus, the enclave must rely on the untrusted host software, such as an operating system or hypervisor, for certain tasks. One way to accomplish this is to incorporate a scheduler code in the enclave, but this would overcomplicate the enclave, which would increase an attack surface at the enclave's boundary.

FIG. 4 shows an example timing diagram 400 for handling threads of execution without overcomplicating the enclave or increasing the attack surface, where the arrows represent the flow of data, message, or information between various components. The example operations shown in FIG. 4 may be performed by one or more processors of a host computing device for an enclave, such as enclaves 160, 170, 180 and 190 and one or more processors 112 of the computing devices 110, 120, 130.

FIG. 4 shows various threads created by host software, here an Operating System 420, Thread A 430 and Thread B 440, inside and outside of an Enclave 410 (dashed-line box). In this example, enclave 410 may represent any of enclaves 160, 170, 180 and 190. As such, enclave 410 may be implemented on any of a number of different types of backends and system configurations, for example, such as the example system configurations for Trusted Enclave 314 shown in FIGS. 3A-D. As described above with respect to FIG. 2, an enclave, such as Enclave 410, may have entry points through which code, such as Thread A 430 and Thread B 440, may enter and exit.

Events of the operations of FIG. 4 are shown in an example chronological order from top to bottom. Starting from the top of the diagram, Thread A 430, which requires the functionality of enclave 410 to accomplish some task, enters the Enclave 410 via entry point "EnterAndRun( )" Once inside the Enclave 410, Thread A may trigger additional processes. For instance, in Enclave 432 receives a request from the application running inside the Enclave 410 for a new thread of execution for one of its functions. As shown, the application made the request by calling "pthread_ create( )" with a "start_routine." A queue of "start_routine" requested by various functions may be created, updated, and otherwise maintained by runtime functionality of the Enclave 410 as metadata in the enclave. The runtime functionality for Enclave 410 may also use metadata of the enclave to track which function the application inside the Enclave 410 is requesting a thread for, the function's argument, and a return value. The metadata may also store information such as waiting to execute, running, returned, or joined in order to track the status of the thread. Such thread status metadata may thus allow the application running inside of Enclave 410 to use POSIX threading APIs to wait for a thread and gets the thread's return value. For instance, "host_donate_thread return" may be the return value for an existing call in FIG. 4."

Thread A in Enclave 432 then exits the Enclave 410 via exit point "host_donate_thread( )", for instance, making a call to request the Operating System 420 for a new thread. Once outside the Enclave 410, Thread A 430 requests Operating System 420 to create a thread by calling "pthread_ create( )" A return value is represented by "pthread_create return". The Operating System 420 responds by sending the return value to Thread A 430 and creates a new thread, Thread B 440, outside the Enclave 410.

After learning from "pthread_create return" ("return from pthread_create( )") that a new thread, Thread B 440, has been created by the Operating System 420, Thread A 430 re-enters the Enclave 410 to wait for Thread B 440 to also enter the Enclave 410. Once Thread B 440 enters Enclave 410 via entry point "donate_thread( )" Thread B in Enclave 442 checks the "start_routine" queue and executes the function in the queue that requested it (i.e. requested a new thread that is now Thread B). In addition, Thread B 440 entering Enclave 410 also triggers the removal of the function from the queue (and/or the request for a new thread, now Thread B, from the queue). Once Thread B in Enclave 442 finishes executing the function requested of it, Thread B in Enclave 442 saves the return value and then exits the Enclave 410 (not shown).

If, upon entering Enclave 410, Thread B in Enclave 442 found that the "start_routine" queue is empty, Thread B in Enclave 442 then would either leave the Enclave 410 and return to some location where it is needed outside the Enclave or tear down the Enclave 410 due to an unexpected condition, such as when the queue is empty.

Applications operating inside an enclave commonly must save state in order to be effective, but the enclave does not have direct access to any persistent hardware and the host, such as an operating system or hypervisor, is not trusted to securely persist sensitive data on the enclave's behalf. Further, applications running in the enclave may not have been written with an adversarial host in mind, and therefore security requirements of individual data persistence operations may need to be inferred based on context. To reduce the attack surface at the enclave's boundary, instead of including file system implementation in the enclave, the example features described herein selectively delegate file operations to the host, such as an operating system or hypervisor, and provide additional protections by the enclave as needed.

In this regard, file paths are separated into access domains having different security properties. The access domains may be configured during initialization of the enclave. A file path may be designated with a path prefix to indicate that the file path belongs to a particular access domain. All file paths having the same path prefix belong to the same access domain, unless the path prefix is superseded by a more specific prefix for another access domain.

Likewise for directories, the same security properties can be maintained for all members of one directory recursively. The access domains may be nested within each other by having a path with another access domain as a directory ancestor, in which case the descendent access domain does not inherit security properties from the ancestor. For instance, for a given access domain at "/ABC" and another one at "/ABC/123r", these directories are nested. However, the access domains may not be related in any meaningful way: the fact that "/ABC/123" shares part of its prefix with "/ABC" does not mean that it inherits any of the properties of "/ABC").

Figure 5A:
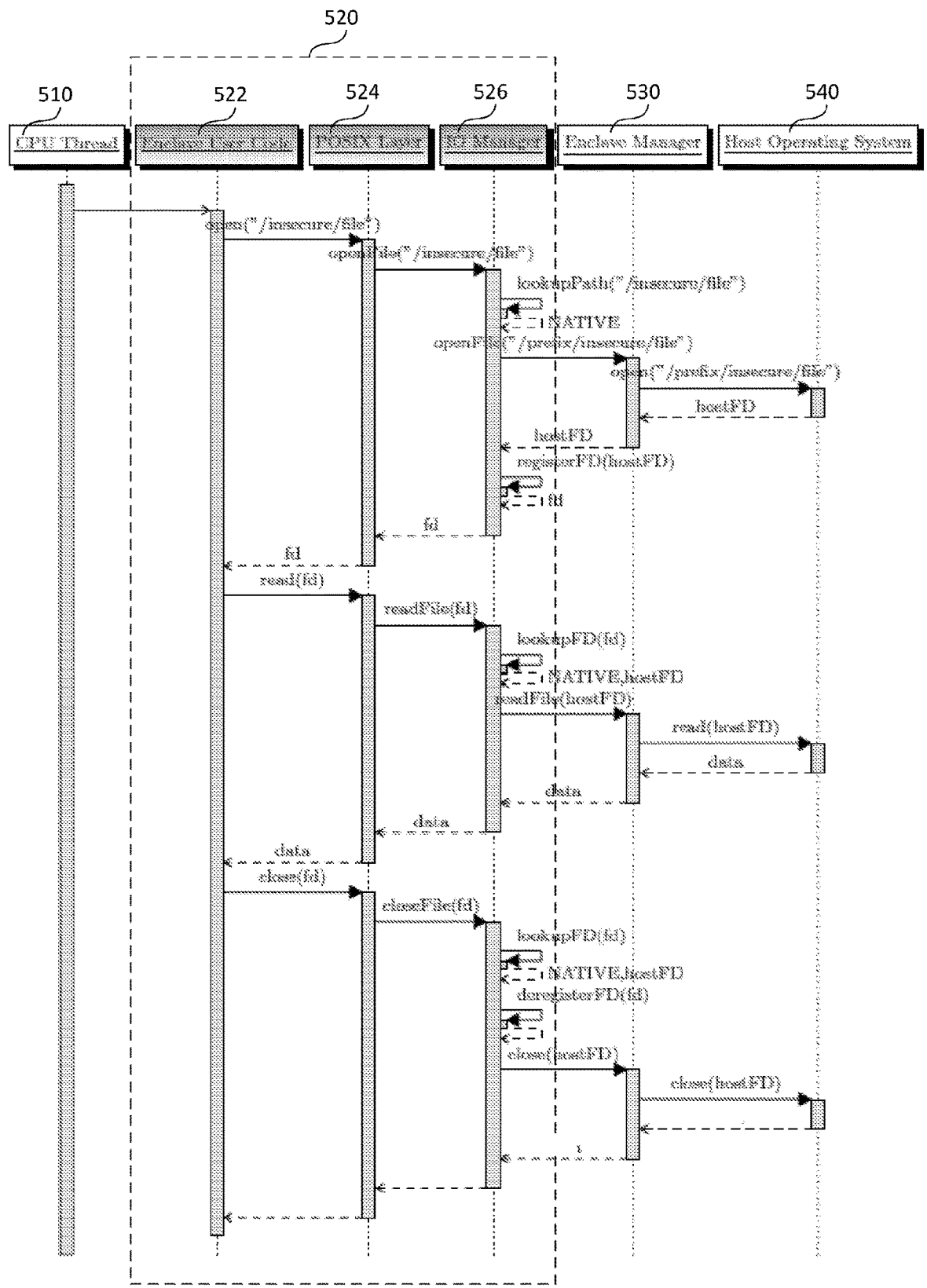
FIGS. 5A-C are example timing diagrams according to aspects of the disclosure.
Figure 5B:
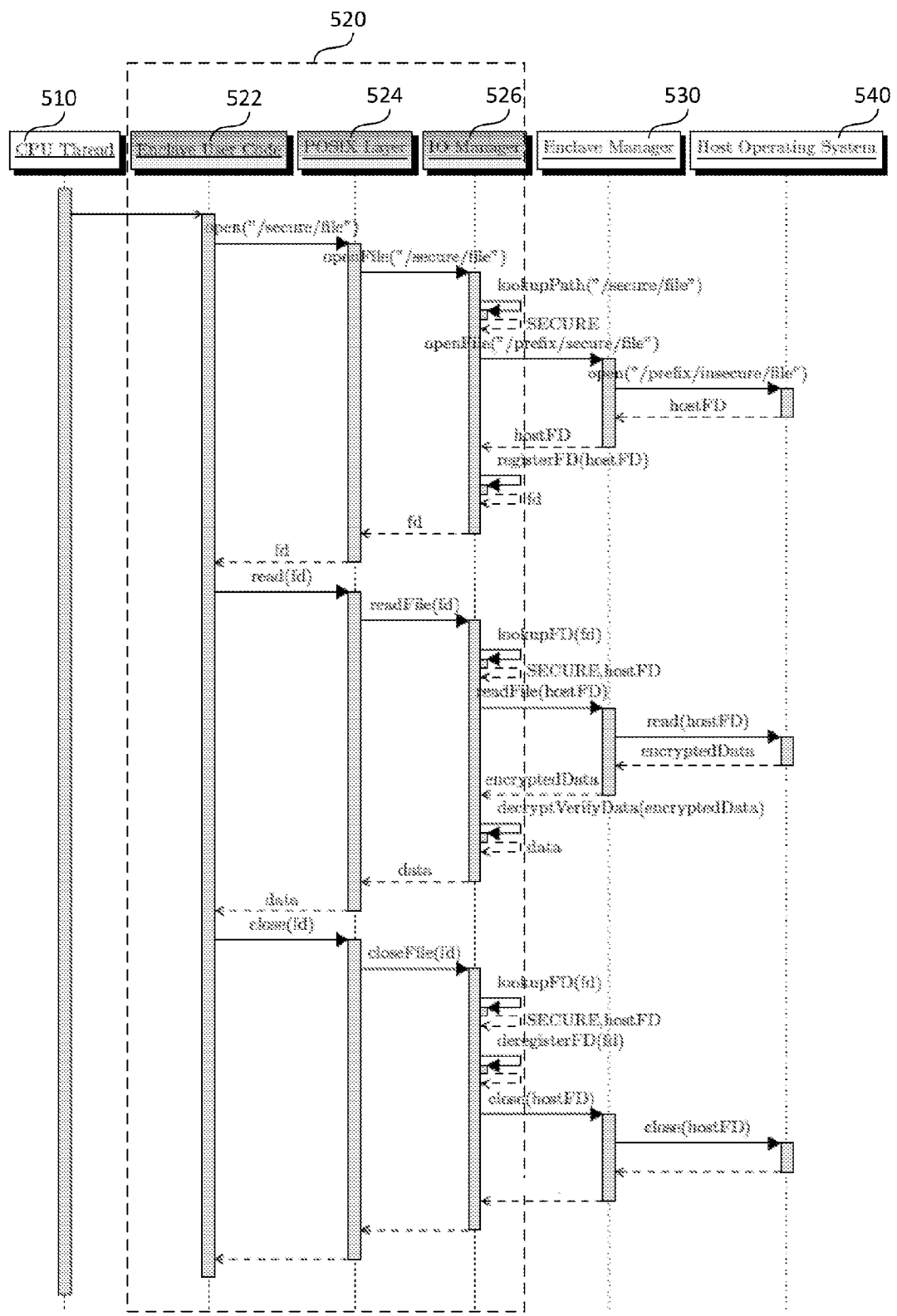
Figure 5C:
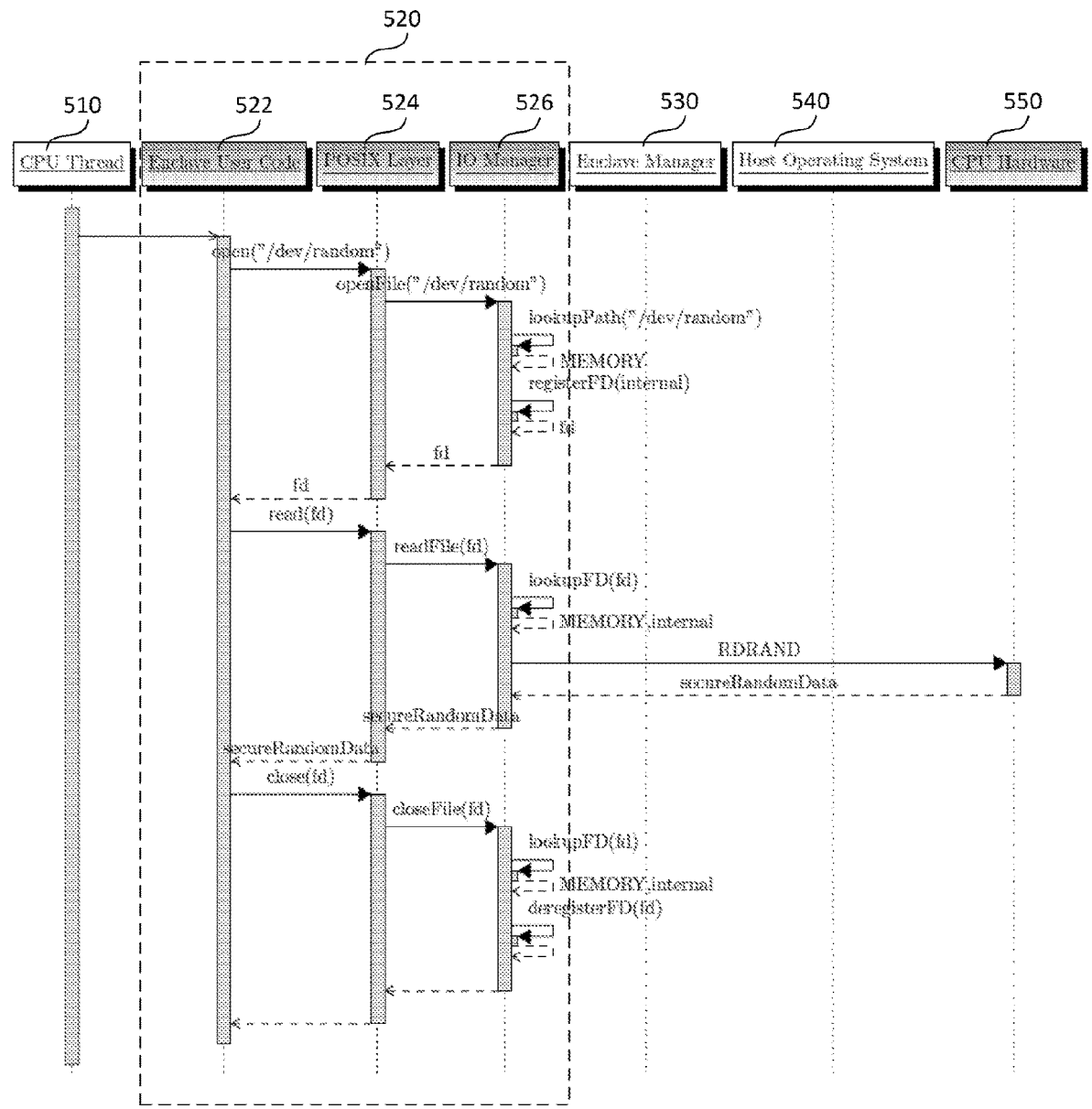

FIGS. 5A-C show example timing diagrams 500A-C for handling various types of files, where the arrows represent the flow of data, message, or information between various components. The example operations shown in FIG. 5 may be performed by one or more processor of a host computing device for an enclave, such as enclaves 160, 170, 180 and 190 and the one or more processors 112 of the computing devices 110, 120, 130. FIGS. 5A-C show an Enclave 520 (dashed-line box) having an IO Manager 526 responsible for delegation of file operations. In this example, enclave 520 may represent any of enclaves 160, 170, 180 and 190. As such, enclave 520 may be implemented on any of a number of different types of backends or system configurations, such as the example system configurations for Trusted Enclave 314 shown in FIGS. 3A-D. As described above with respect to FIG. 2, an enclave, such as Enclave 520, may have entry points through which code may enter and exit.

FIG. 5A shows example file operations for a host access domain A host access domain may be configured for handling non-sensitive data that is expected to be available and modifiable by other untrusted software running within the host computing device and host software, for instance, operating system or hypervisor. Events of the example operations of FIG. 5A are shown in an example chronological order from top to bottom.

The first file operation shown is an open operation. Initially, the CPU is executing code, here Thread 510, inside of Enclave 520. Inside the Enclave 520, an application of the Enclave User Code 522 requests to open a file at file path "/insecure/file." The request reaches and initiates the POSIX Layer 524 within the Enclave 520. The POSIX Layer 524 then passes on the request to an IO Manager 526 within the Enclave 520, which is responsible for deciding whether to delegate the file operations to the Host Operating System 540. The IO Manager 526 looks up the file path "/insecure/file," determines that the file path indicates that the file is in the host access domain and may add a path prefix to the file path.

The file path may also include flags for the POSIX calls, like open, that may include additional arguments that tell it to open the file read-only/read-write/etc or whether to create the file if it doesn't exist, etc. However, across different backends, the values of those flags (e.g., is read-write a "1" or a "2") can vary, so translation needs to occur. As such, the IO Manager 526 then translates any flag, which may be different for different backends (i.e. different application programming interfaces, etc.), into corresponding host or native values of the Host Operating System 540 ("NATIVE" or Host Access Domain), and delegates the open operation to the Host Operating System 540 using the native values. This enables the IO Manager 526 to function like a virtual filesystem.

Next, the IO Manager 526 passes on the prefixed path to the Enclave Manager 530 outside the Enclave 520. The Enclave Manager 530 then requests the Host Operating System 540 to open the file at the prefixed file path. The Host Operating System 540 opens the file and returns a file descriptor "hostFD" to the Enclave Manager 530. The Enclave Manager 530 then returns hostFD from the open file call.

The IO Manager may maintain a registry or mapping of host file descriptors, internal file descriptors (that is, file descriptors to be used inside of the enclave) and other information. For instance, when the IO Manager, registers hostFD, the IO Manager also creates a mapping between the host file descriptor (hostFD) and its own set of file descriptors (in this case, fd). In this regard, all interactions with the file descriptor inside of the enclave is according to the IO Manager's mapping (i.e. hostFD is used outside of the enclave and hostFD is referred to as fd inside the enclave). As such, the file descriptor "fd" is then passed back to the POSIX Layer 524 and then to the Enclave User Code 522.

The second file operation shown is a read operation. An application of the Enclave User Code 522 requests to read the file with file descriptor fd. The request reaches the POSIX Layer 524 within the Enclave 520. The POSIX Layer 524 then passes on the request to the IO Manager 526 within the Enclave 520. The IO Manager 526 looks up the file descriptor fd ("lookupFD(fd)") in the mapping (i.e. hostFD), delegates the read operation to the Host Operating System 540, and translates any flag into native values of the Host Operating System 540. Next, the IO Manager 526 passes on the file descriptor hostFD to the Enclave Manager 530 outside the Enclave 520. The Enclave Manager 530 then requests the Host Operating System 540 to read the file with the file descriptor hostFD. The Host Operating System 540 reads the file and returns data read from the file to the Enclave Manager 530. The Enclave Manager 530 passes the data to the IO Manager 526 inside the Enclave 520, which in turn passes the data back to the POSIX Layer 524, and the POSIX Layer 524 passes the data back to the Enclave User Code 522.

The third file operation shown is a close operation. An application of the Enclave User Code 522 requests to close the file with file descriptor fd. The request reaches the POSIX Layer 524 within the Enclave 520. The POSIX Layer 524 then passes on the request to the IO Manager 526 within the Enclave 520. The IO Manager 526 looks up the file descriptor fd, delegates the close operation to the Host Operating System 540, and translates any flag into native values of the Host Operating System 540. The IO Manager 526 also deregisters the file with file descriptor fd. Next, the IO Manager 526 passes on the file descriptor hostFD to the Enclave Manager 530 outside the Enclave 520. The Enclave Manager 530 then requests the Host Operating System 540 to close the file with the file descriptor hostFD. The Host Operating System 540 then closes the file.

FIG. 5B shows example file operations for a secure access domain A secure access domain may be configured for handling encrypted or signed data. The host need not be trusted for handling such encrypted or signed data because only the enclave has the necessary keys, thus the untrusted host only has access to the data in the encrypted/signed form. Events of the example operations are shown in FIG. 5B in am example chronological order from top to bottom.

The first file operation shown is an open operation. Initially, the CPU is executing code, here Thread 510, inside of Enclave 520. Inside the Enclave 520, an application of the Enclave User Code 522 requests to open a file at file path "/secure/file." The request reaches the POSIX Layer 524 within the Enclave 520. The POSIX Layer 524 then passes on the request to the IO Manager 526 within the Enclave 520. The IO Manager looks up the file path "/secure/file," determines that the file path indicates that the file is in the secure access domain ("SECURE"), and adds a file prefix to the file path. The IO Manager 526 then translates any flag into native values of the Host Operating System 540, and delegates the open operation to the Host Operating System 540 using the native values. Next, the IO Manager 526 passes on the prefixed file path to the Enclave Manager 530 outside the Enclave 520. The Enclave Manager 530 then passes the prefixed path to the Host Operating System 540 to open the file. The Host Operating System 540 opens the file and returns a file descriptor hostFD to the Enclave Manager 530. IO Manager 526 then registers the file descriptor hostFD and stores to the mapping, as discussed above, the file descriptor fd. The file descriptor fd is then passed back to the POSIX Layer 524 and then to the Enclave User Code 522.

The second file operation shown is a read operation. An application of the Enclave User Code 522 requests to read the file with file descriptor fd. The request reaches the POSIX Layer 524 within the Enclave 520. The POSIX Layer 524 then passes on the request to the IO Manager 526 within the Enclave 520. The IO Manager 526 looks up the file descriptor fd ("lookupFD(fd)") in the mapping (i.e. hostFD), delegates the read operation to the Host Operating System 540, and translates any flag into native values of the Host Operating System 540. Next, the IO Manager 526 passes on the file descriptor hostFD to the Enclave Manager 530 outside the Enclave 520. The Enclave Manager 530 then requests the Host Operating System 540 to read the file with the file descriptor hostFD. The Host Operating System 540 reads the file and returns encrypted data read from the file to the Enclave Manager 530. Since the encryption key is located only inside the Enclave 520, the Host Operating System 540 would not be able to read the original data. The Enclave Manager 530 then passes the encrypted data to the IO Manager 526 inside the Enclave 520. Once inside the Enclave 520, the IO Manager 526 decrypts the encrypted data with the encryption key inside the Enclave 520 and passes the decrypted data back to the POSIX Layer 524, which the POSIX Layer 524 passes to the Enclave User Code 522. In this regard, encrypted and/or signed data is persisted by creating mirror operations, such that where there is a read operation in the host domain, there is a corresponding read operation in the enclave.

The third file operation shown is a close operation. An application of the Enclave User Code 522 requests to close the file with file descriptor fd. The request reaches the POSIX Layer 524 within the Enclave 520. The POSIX Layer 524 then passes on the request to the IO Manager 526 within the Enclave 520. The IO Manager 526 looks up the file descriptor fd ("lookupFD(fd)") in the mapping (i.e. hostFD) in order to translate from the enclave value to the native value of the host Operating System 540 and delegates the read operation to the Host Operating System 540 using the native value. The IO Manager 526 also deregisters the file with file descriptor fd. Next, the IO Manager 526 passes on the file descriptor hostFD (i.e. the native value) to the Enclave Manager 530 outside the Enclave 520. The Enclave Manager 530 then requests the Host Operating System 540 to close the file with the file descriptor hostFD. The Host Operating System 540 closes the file. Additionally or alternatively, files in the host access domain can also be treated with similar security properties as files in the secure access domain by specifying a flag with the file operation. For example, in FIG. 5A, if the file in the host access domain was opened with a flag O_SECURE, the file would be treated the same way as shown in FIG. 5B. This may allow a user to specify at the time of "open" whether a file is secure rather than when the enclave is create. FIG. 5C shows example operations for a virtual memory access domain representing memory that is not backed by persistent storage and does not involve the host operating system at all. A virtual memory access domain may be configured for handling highly sensitive data intended to be protected by the enclave and not accessible by the untrusted world, including the host. The virtual memory access domain provides virtual devices at standard paths for data generation. This virtual memory may be implemented completely within the enclave, with no delegation or mirror operations to the host. For example, the virtual memory may be used to perform random number generation, which may be useful as because instructions to the CPU may be required to provide the needed entropy for cryptographic-grade random data. The virtual devices may also be used to generate other data, for example completely zeroed data, where deviations from expectations on the data could have dire security consequences. Events of the example operations of FIG. 5C are shown in an example chronological order from top to bottom.

The first file operation shown is an open operation. Initially, the CPU is executing code, here Thread 510, inside of the enclave 520. Inside the Enclave 520, an application of the Enclave User Code 522 requests to open a file at file path "/dev/random." The request reaches the POSIX Layer 524 within the Enclave 520. The POSIX Layer 524 then passes on the request to the IO Manager 526 within the Enclave 520. The IO Manager 526 looks up the file path "/dev/random" and determines that the file path indicates that the file is in the virtual memory access domain ("MEMORY"). Recognizing that highly sensitive data is being handled, the IO Manager 526 does not delegate any operation to the Host Operating System 540 or create any mirror operations to the Host Operating System 540, but simply registers the file as internal in the mapping as described above, and returns file descriptor fd to the POSIX Layer 524. The POSIX Layer 524 in turn passes the file descriptor fd back to the Enclave User Code 522.

The second file operation shown is a read operation. An application of the Enclave User Code 522 requests to read the file with file descriptor fd. The request reaches the POSIX Layer 524 within the Enclave 520. The POSIX Layer 524 then passes on the request to the IO Manager 526 within the Enclave 520. The IO Manager 526 looks up the file descriptor fd and determines that the file descriptor indicates that the file is in the virtual memory access domain. Recognizing that highly sensitive data is being handled, the IO Manager 526 does not delegate any operation to the Host Operating System 540 or create any mirror operations to the Host Operating System 540. Rather, the IO Manager sends a request for a random number ("RDRAND") to be generated directly to the CPU Hardware 550. The CPU Hardware 550 generates secure random data and directly sends the secure random data back to the IO Manager 526 in the Enclave 520. This way, the untrusted Host Operating System 540 cannot manipulate the secure random data. The IO Manager 526 then passes the secure random data to the POSIX Layer 524, which the POSIX Layer 524 passes to the Enclave User Code 522.

The third file operation shown is a close operation. An application of the Enclave User Code 522 requests to close the file with file descriptor fd. The request reaches the POSIX Layer 524 within the Enclave 520. The POSIX Layer 524 then passes on the request to the IO Manager 526 within the Enclave 520. The IO Manager 526 looks up the file descriptor fd and determines that the file descriptor indicates that the file is in the memory device access domain. Recognizing that highly sensitive data is being handled, the IO Manager 526 does not delegate any operation to the Host Operating System 540 or create any mirror operations to the Host Operating System 540, but simply deregisters the file as internal, and nothing is returned o the POSIX Layer 524. Thus, the POSIX Layer 524 passes nothing to the Enclave User Code 522.

Although FIGS. 5A-C show single path based file operations, the operations shown are may also be applicable to multiple path based operations. Signals may provide ways to deliver asynchronous events to a process of a thread. A signal can be sent from a kernel to a process, from a process to another process, or from the process to itself. For example, a Linux kernel implements a plurality of different types of signals where users are able to implement their own signal handlers for all except SIGKILL and SIGSTOP. However, in the case of enclaves, wherein there is no operating system, when a signal arrives, the thread/process that runs the enclave is interrupted, and the operating system's default handler will be called, which usually terminates the application in the enclave without the enclave being aware of the signal. Further, containers (such as Nginx, Redis, MySQL) may register their own signal handler in the source code, but would not be able to run in an enclave where signals are not available. Although some software packages (such as Intel SGX, SDK) have built-in signal handling for a few signals, they are not extensible to new signals other than those already supported.

As such, the example systems described herein provide a framework that implements signals inside an enclave so that users could register their own signal handler or ignore certain signals inside the enclave, just as they could if the application is running directly on the host. The example systems maintain a mapping between registered signals and registered handlers inside the enclave. A signal handler registered by a user is stored as a signal handler inside the enclave. Meanwhile, a function that enters the enclave and calls the corresponding signal handler in the enclave is registered as a host signal handler on the host. Thus, when a signal arrives, the host signal handler is called by the host operating system to identify the right enclave to enter, enter the boundary of that enclave, and then find and call the registered signal handler inside the enclave.

Figure 6A:
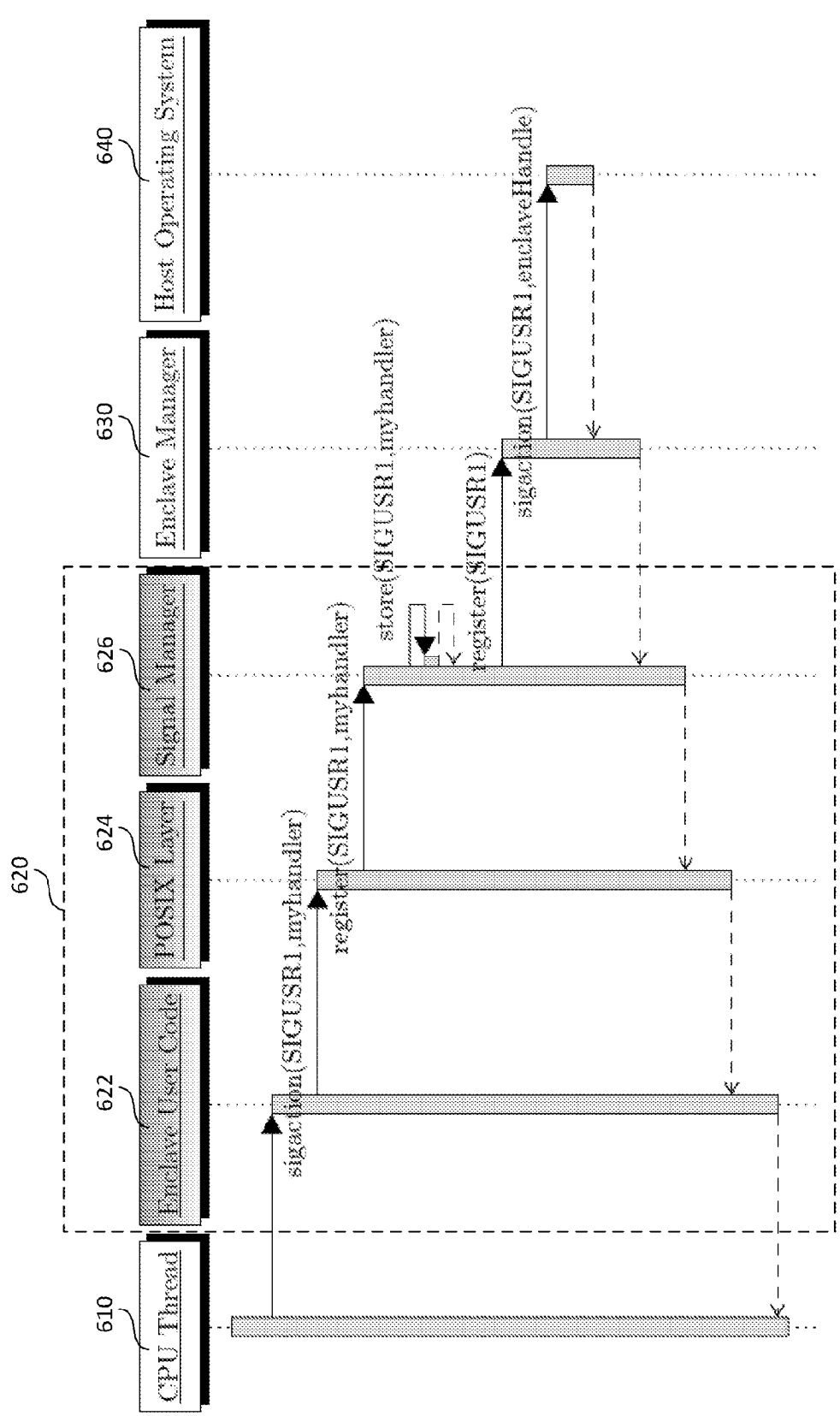
Figure 6C:
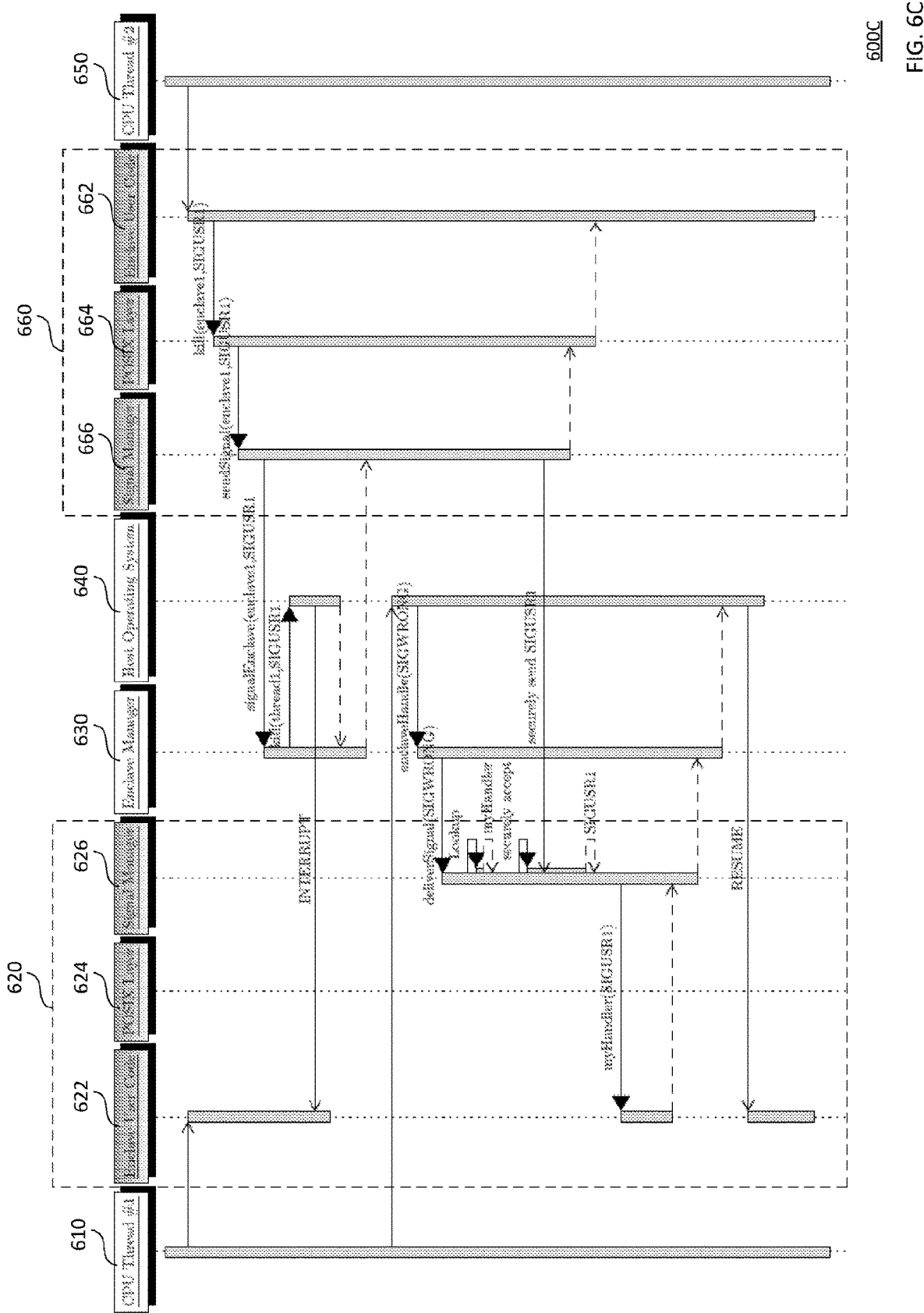

FIGS. 6A-C show example timing diagrams 600A-C for handling signals, where the arrows represent the flow of data, message, or information between various components. The example operations shown in FIG. 6 may be performed by one or more processors of a host computing device for an enclave, such as enclaves 160, 170, 180 and 190 and the one or more processors 112 of the computing devices 110, 120, 130. FIGS. 6A-C show an Enclave 620 (dashed-line box) having a Signal Manager 626 inside that keeps a mapping of signals. In this example, enclave 620 may represent any of enclaves 160, 170, 180 and 190. As such, enclave 620 may be implemented on any of a number of different types of backends and system configurations, for example, such as the example system configurations for Trusted Enclave 314 shown in FIGS. 3A-D. As described above with respect to FIG. 2, an enclave, such as Enclave 620, may have entry points through which code may enter and exit.

FIG. 6A shows example operations when a signal handler is registered. Events of the example operations are shown in an example chronological order from top to bottom. Initially, the CPU is running code, such as Thread 610, inside of the Enclave 620. A user defines a signal handler function "myhandler" in the Enclave User Code 622 inside the Enclave 620. The handler may be called using the POSIX API "sigaction 0" such that, when a signal "SIGUSR1" is received, "myhandler" is the user-defined routine that handles SIGUSR1. The signal SIGUSR1 and its user-defined signal handler myhandler are then registered in a registry of the POSIX Layer 624. This mapping of SIGUSR1 to myhandler is then stored in the Signal Manager 626. The Host Operating System 640 also needs to know this mapping so that it knows that SIGUSR1 should be handled inside the Enclave 620. In this regard, Signal Manager 626 sends the registration of SIGUSR1 to Enclave Manager 630 outside the Enclave 620. The Enclave Manager 630 then defines a corresponding function "signalHandler" and calls "sigaction ( )" in the Host Operating System 640 instructing the Host Operating System 640 that, if signal SIGUSR1 is received, the Host Operating System 640 should send a host signal function "enclaveHandler" into the Enclave 620 to find the myhandler function to handle SIGUSR1.

However, signals may be defined differently across different platforms, and may also be defined differently inside the enclave by the user as compared to by the host. Thus, a user who registers one signal number or value inside the enclave may end up registering a completely different signal number or value on the host. For instance, SIGURS1 may have a value of 4 inside of the enclave and a value of 7 outside of the enclave. To avoid this problem, as in the examples above, the native values may be translated to enclave values. As an example, register(SIGUSR1) call may invoke translation from the enclave value of SIGUSR1 to the native value of SIGUSR1, and a deliverSignal(SIGUSR1) call may invoke translation from native value of SIGUSR1 to the encalve value of SIGUSR1. In other words, the signal value may also be translated between values native to the host operating system and native to the client. In some instances, a bridge value may be used such that every time a user registers a signal, it may be translated to this bridge value before exiting the enclave. Once outside the enclave, the bridge value may be translated into a corresponding host value before it is registered on the host. Likewise, when a signal arrives at the enclave, it may be first translated into the bridge value before entering the enclave, and once inside the enclave, the bridge value may be translated into a corresponding enclave value FIG. 6B shows example signal handling operations of a signal delivered from the host to the enclave. Events of the example operations of FIG. 6B are shown in an example chronological order from top to bottom. Initially, while CPU is running an application using Thread #1 610, another application running Thread #2 650 wants to send a signal SIGUSR1 to Thread #1. The Host Operating System 640 interrupts an application in the Enclave User Code 622, but also determines that the function enclaveHandle was registered on the host to handle SIGUSR1. The enclaveHandle then informs Enclave Manager 630 that it is an exception handler and enters the Enclave 620 to deliver information of the signal SIGUSR1 to the Signal Manager 626 inside the Enclave 620 and to find the user-defined signal handler myHandler to handle SIGUSR1. If, however, enclaveHandle does not find any signal handler registered by the user to handle SIGUSR1 in the Enclave 620, SIGUSR1 would be ignored.

Once inside the Enclave 620, the Signal Manager 626 and finds that myHandler is registered by the user to handle SIGUSR1. The function myHandler then calls myHandler in the Enclave User Code 622 to handle SIGUSR1. After SIGUSR1 is handled, the Host Operating System 640 then resumes the application in the Enclave User Code 622.

FIG. 6C shows example signal handling operations of a signal delivered from one enclave to another enclave. In contrast to the example in FIG. 6B, where the signal sent originated from outside the Enclave 620 and therefore cannot be trusted, FIG. 6C shows an example when a signal originated from inside one enclave is to be sent to another enclave. Because both enclaves are secure from manipulations by the untrusted host, such a signal can be trusted if a trustworthy signal delivery mechanism is set up. In this regard, FIG. 6C shows that a secure connection, for instance via RPC, may be established between the two enclaves to ensure secure delivery.

Events of the example operations of FIG. 6C are shown in an example chronological order from top to bottom. Initially, while CPU is running an application on Thread #1 610, another application running Thread #2 650 wants to send a signal SIGUSR1 to the enclave 620 which is running on Thread #1. For instance, the function kill( ) may be a POSIX interface that sends a signal ("SIGURS1") to a process ("enclave1", here Enclave 620). The signal SIGUSR1, which originated from Enclave User Code 662 in a Second Enclave 660 (dashed-line box), is directed for Enclave 620. The Second Enclave 660, like Enclave 620, may be implemented on any of a number of different types of backends, for example, such as the example backends for Trusted Enclave 314 shown in FIGS. 3A-D. In this example and for ease of representation, the enclaves may share a single enclave manager, though multiple enclave managers may also be utilized.

The signal reaches POSIX Layer 664 of the Second Enclave 660, and then tells the Signal Manager 666 of the Second Enclave 660 to send the signal to the Enclave 620. The Signal Manager 666 of the Second Enclave 660 then forwards the signal to the Enclave Manager 630. The Enclave Manager 630 forwards the kill function, now directed to a specific thread ("thread1") rather than a process or enclave, to the Host Operating System 640. The Host Operating System 640 interrupts Enclave User Code 622 of the Enclave 620. However, instead of passing on the signal SIGUSR1, the Host Operating System 640 is hostile and sends a signal SIGWRONG to the Signal Manager 626 of the Enclave 620.

The Signal Manager 626 of the Enclave 620 looks up SIGWRONG and may establish a secure channel, for instance via RPC, with the Signal Manager 626 of the Second Enclave 660. Over the established RPC, the Signal Manager 666 of the Second Enclave 660 sends the signal SIGUSR1 to the Signal Manager 626 of the Enclave 620. The Signal Manager 626 of the Enclave 620 then calls the user defined signal handler myHandler in the Enclave User Code 622 to handle SIGUSR1. After SIGUSR1 is handled, the Host Operating System 640 then resumes the application in the Enclave User Code.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for creating trusted applications stored in memory of a host computing device, the method comprising:

creating, by one or more processors of the host computing device, an enclave manager in an untrusted environment of the host computing device, the enclave manager including instructions for creating one or more enclaves, wherein the enclave manager is created by an application running in the untrusted environment and implemented on the one or more processors;

generating, by the one or more processors, an enclave in memory of the host computing device using the enclave manager;

generating, by the enclave manager implemented on the one or more processors, one or more enclave clients of the enclave in the untrusted environment, the one or more enclave clients configured to provide one or more entry points into the enclave; and creating, by the one or more processors, one or more trusted application instances in the enclave.

2. The method of claim 1, wherein the entry points include a plurality of different functions.

3. The method of claim 2, wherein the plurality of different functions include one or more of an initialize function, a finalize function, a run function, a donate thread function, a handle signal function, and a destroy function.

4. The method of claim 3, wherein the initialize function allows the one or more enclave clients to take system resources to run the one or more trusted application instances.

5. The method of claim 3, wherein the finalize function allows the one or more enclave clients to relinquish system resources.

6. The method of claim 3, wherein the run function allows the one or more enclave clients to execute functions of the one or more trusted application instances.

7. The method of claim 3, wherein the donate thread function allows the one or more enclave clients to have an operating system of the host computing device provide a thread to enter the enclave.

8. The method of claim 3, wherein the handle signal function allows the one or more enclave clients handle signals sent to the one or more trusted application instances.

9. The method of claim 3, wherein the destroy function allows the one or more enclave clients to terminate the enclave.

10. The method of claim 1, wherein the one or more enclave clients are further configured to allow code to run in the enclave.

11. The method of claim 1, wherein generating the enclave includes using an application having a trusted application designation.

12. The method of claim 1, further comprising using the enclave manager to maintain a hierarchical namespace by binding the enclave to an identifier in the hierarchical namespace.

13. The method of claim 1, wherein the one or more trusted application instances includes code that stores sensitive data of an application running in the untrusted environment.

14. The method of claim 13, wherein the one or more trusted application instances includes code that executes the sensitive data of the application.

15. The method of claim 1, further comprising, using the enclave manager to provide platform services including a software-based clock.

16. The method of claim 1, wherein the enclave is generated in a system having an isolation kernel and isolation capable hardware.

17. The method of claim 1, wherein the enclave is generated in a system having hardware secure execution primitives and isolation capable hardware.

18. The method of claim 1, wherein the enclave is generated in a system having a hardware secure element.

19. The method of claim 1, wherein the enclave is generated in a system remote from the untrusted environment.

* * * * *